(12) United States Patent
Ogasawara et al.

(10) Patent No.: US 7,889,957 B2
(45) Date of Patent: Feb. 15, 2011

(54) OPTICAL SELECTOR SWITCH AND SIGNAL-PROCESSING APPARATUS

(75) Inventors: Hidehiko Ogasawara, Tokyo (JP); Nozomu Ozaki, Kanagawa (JP); Seiji Wada, Kanagawa (JP); Toshiyuki Sekiya, Tokyo (JP); Ken Hayakawa, Kanagawa (JP); Kazuo Haraoka, Tokyo (JP); Shinji Sangawa, Tokyo (JP); Masaaki Hattori, Chiba (JP); Naoki Kaneko, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 12/397,854

(22) Filed: Mar. 4, 2009

(65) Prior Publication Data
US 2009/0252453 A1 Oct. 8, 2009

(30) Foreign Application Priority Data
Mar. 5, 2008 (JP) ............................. 2008-055569
Sep. 11, 2008 (JP) ............................. 2008-234011

(51) Int. Cl.
*G02B 6/26* (2006.01)
(52) U.S. Cl. ............................. 385/18; 385/19; 385/36; 385/38
(58) Field of Classification Search .................. 385/36, 385/38
See application file for complete search history.

(56) References Cited

U.S. PATENT DOCUMENTS 5,056,887 A * 10/1991 Ohshima ...................... 385/36
5,822,475 A 10/1998 Hirota et al.

FOREIGN PATENT DOCUMENTS

JP 10-123350 5/1998

* cited by examiner

*Primary Examiner*—Jerry T Rahll
(74) *Attorney, Agent, or Firm*—Oblon, Spivak, McClelland, Maier & Neustadt, L.L.P.

(57) ABSTRACT

An optical selector switch contains an optical waveguide that includes a first optical waveguide portion having a first light-transmissivity, a second optical waveguide portion having a second light-transmissivity, reflecting members that reflect light, and a light-dividing device that reflects and transmits light; at least one light-emitting unit that emits the light toward the first optical waveguide portion of the optical waveguide; and at least one light-receiving unit that receives the light which is incident to the first optical waveguide portion of the optical waveguide from the light-emitting unit, based on a directivity due to an angle of the incident light to the first optical waveguide portion of the optical waveguide, wherein the incident light to the first optical waveguide portion is emitted radially toward the circumference of the second optical waveguide portion of the optical waveguide.

22 Claims, 26 Drawing Sheets

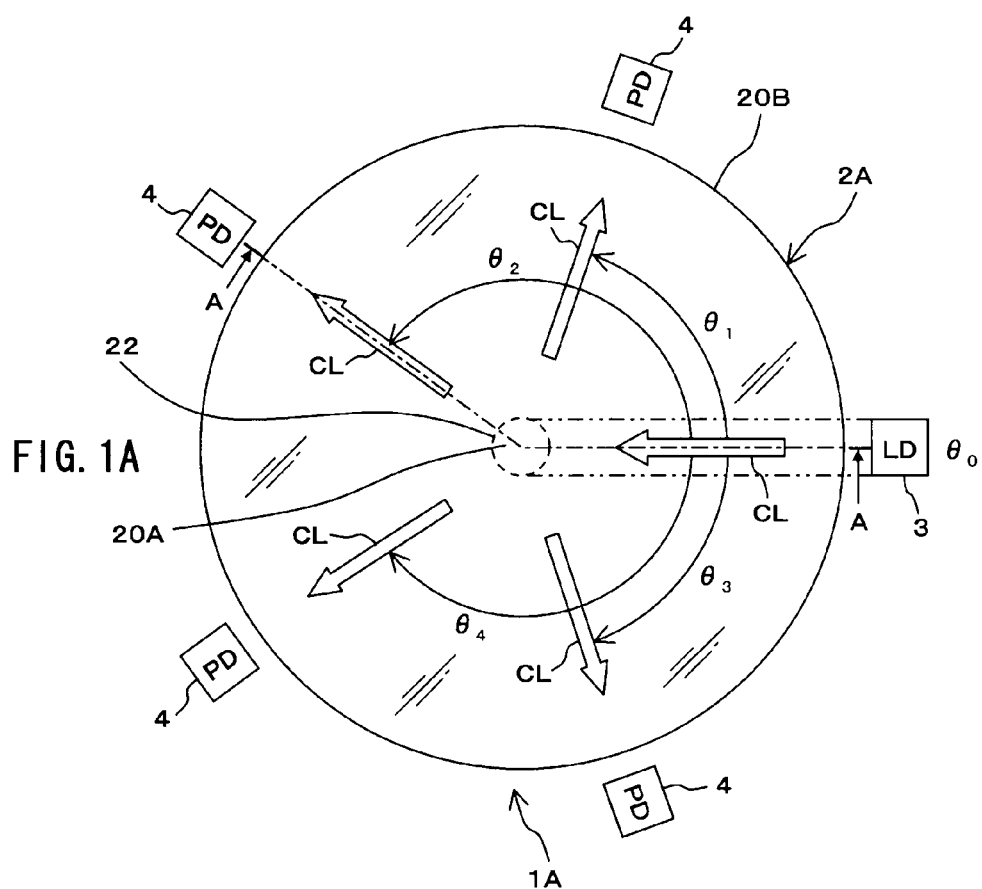
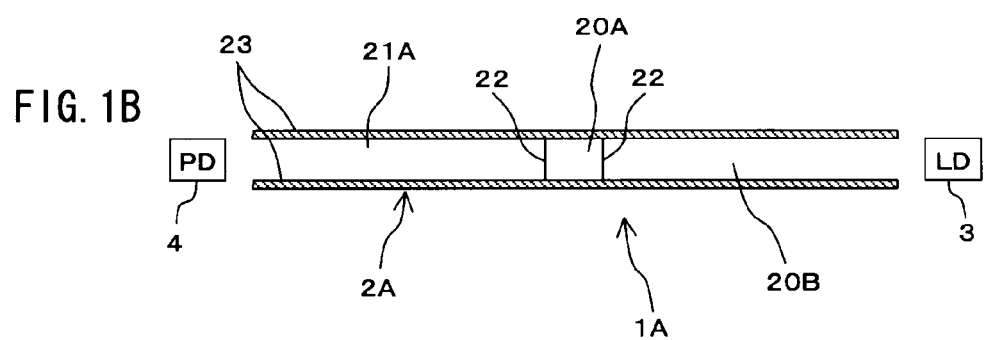

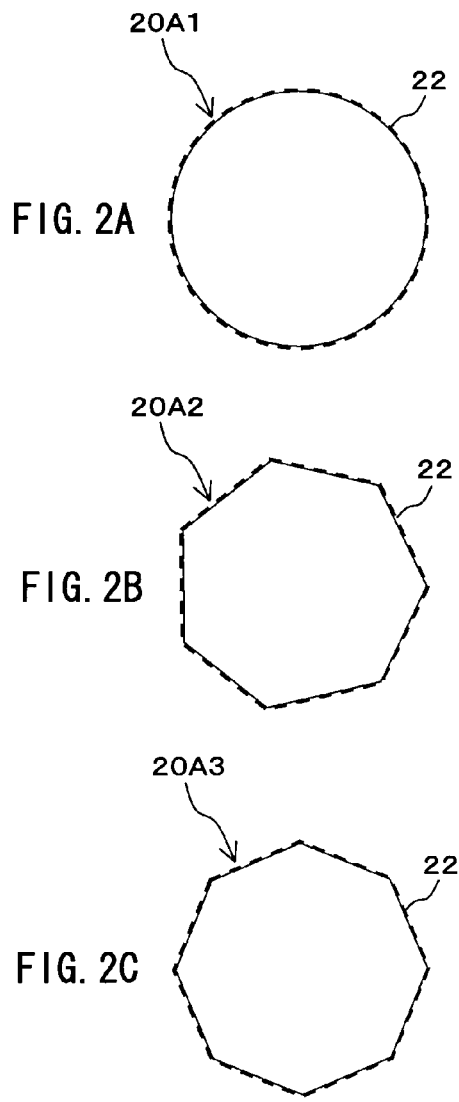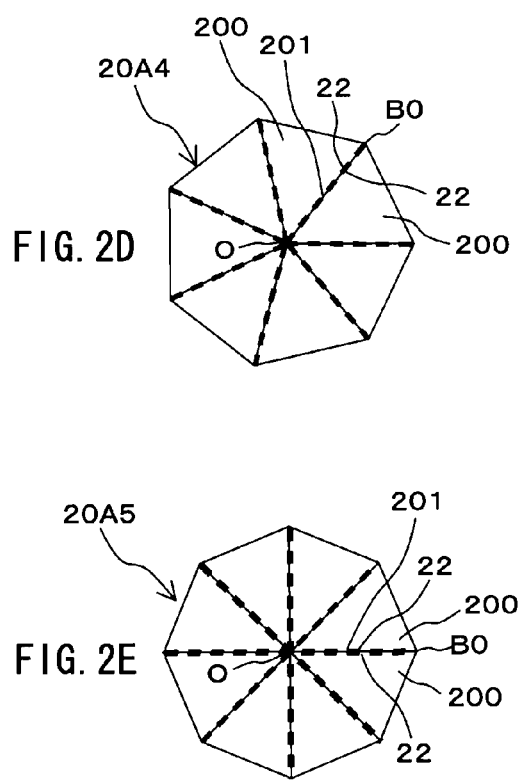

| | NUMBERS | DESCRIPTIONS |
|---|---|---|
| ld_no | 100 | NUMBERS OF DIVIDED INPUT LIGHT SOURCE |
| ld_power | 720 | LASER POWER [mA] |
| sp_type | ns | SPECTRUM [Cs] |
| sp_no | LUT | WAVELENGTH OF LIGHT SOURCE SET BASED ON sp_type VALUE WITH REFERRING TO TABLE 01:ld_wave |

FIG. 11

Table01: Id_wave

| WAVELENGTHS | SYMBOLS | SPECTRAL LINES | LIGHT SOURCES |
|---|---|---|---|
| 1013.98 | n t | INFRARED;MERCURY | H g |
| 852.11 | n s | INFRARED;CESIUM | C s |
| 768.19 | n A' | RED;POTASSIUM | K |
| 706.52 | n r | RED;HELIUM | H e |
| 656.27 | n C | RED;HYDROGEN | H |
| 643.85 | n C' | RED;CADMIUM | C d |
| 632.8 |  | He-Ne LASER | He-Ne |
| 589.29 | n D | YELLOW;SODIUM | N a |
| 587.56 | n d | YELLOW;HELIUM | H e |
| 546.07 | n e | GREEN;MERCURY | H g |
| 486.13 | n F | BLUE;HYDROGEN | H |
| 479.99 | n F' | BLUE;CADMIUM | C d |
| 435.83 | n g | BLUE;MERCURY | H g |
| 404.66 | n h | VIOLET;MERCURY | H g |
| 365.01 | n i | ULTRAVIOLET;MERCURY | H g |

FIG. 12

|  | NUMBERS | DESCRIPTIONS |
|---|---|---|
| mt_a_r | 10 | DIAMETER [mm] OF FIRST OPTICAL WAVEGUID PORTION |
| mt_a_t | 1 | THICKNESS [mm] OF FIRST OPTICAL WAVEGUID PORTION |
| mt_a_p | c(0,0) | COORDINATE [mm] OF CENTER OF FIRST OPTICAL WAVEGUID PORTION |
| mt_a | BK7 | NAME OF MATERIAL |
| mt_a_refraction | LUT | REFRACTIVE INDEX SET BASED ON mt_a VALUE WITH REFERRING TO TABLE 02: BK7 |
| mt_a_z | AL_011 | NAME OF REFLECTING MATERIAL |
| mt_a_z_LUT | LUT | REFLECTIVITY OF REFLECTING MATERIAL SET IN CONNECTION WITH WAVELENGTH AND INCIDENT ANGLE |

FIG. 13A

Table02:BK7

| BK7 |
|---|
| vd: |
| 64.17 |
| nt: |
| 1.50731 |
| ns: |
| 1.5098 |
| nr: |
| 1.51289 |
| nC: |
| 1.51432 |
| nd: |
| 1.5168 |
| ne: |
| 1.51872 |
| nF: |
| 1.52238 |
| ng: |
| 1.52668 |
| nh: |
| 1.53024 |
| ni: |
| 1.53627 |

FIG. 13B

Table03:Air

| air |
|---|
| vd: |
| 0 |
| nt: |
| 1 |
| ns: |
| 1 |
| nr: |
| 1 |
| nC: |
| 1 |
| nd: |
| 1 |
| ne: |
| 1 |
| nF: |
| 1 |
| ng: |
| 1 |
| nh: |
| 1 |
| ni: |
| 1 |

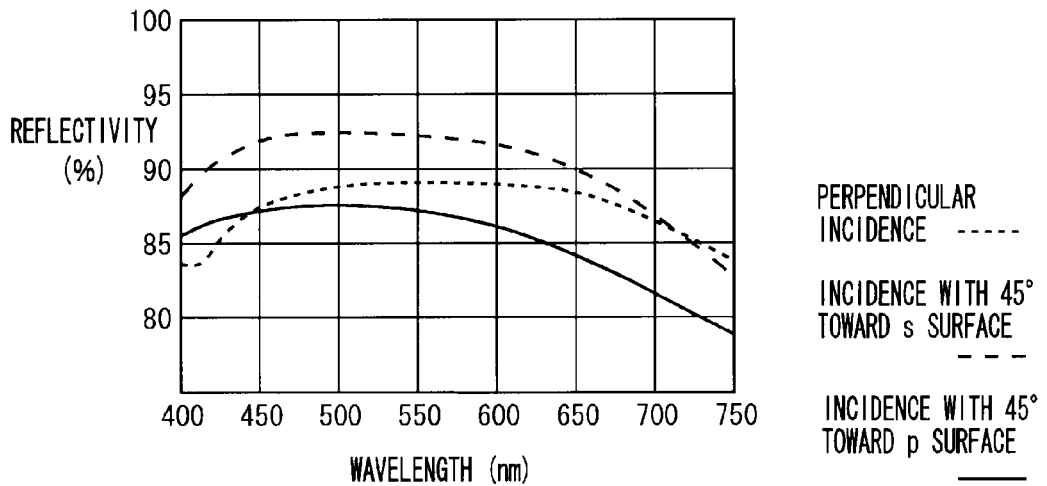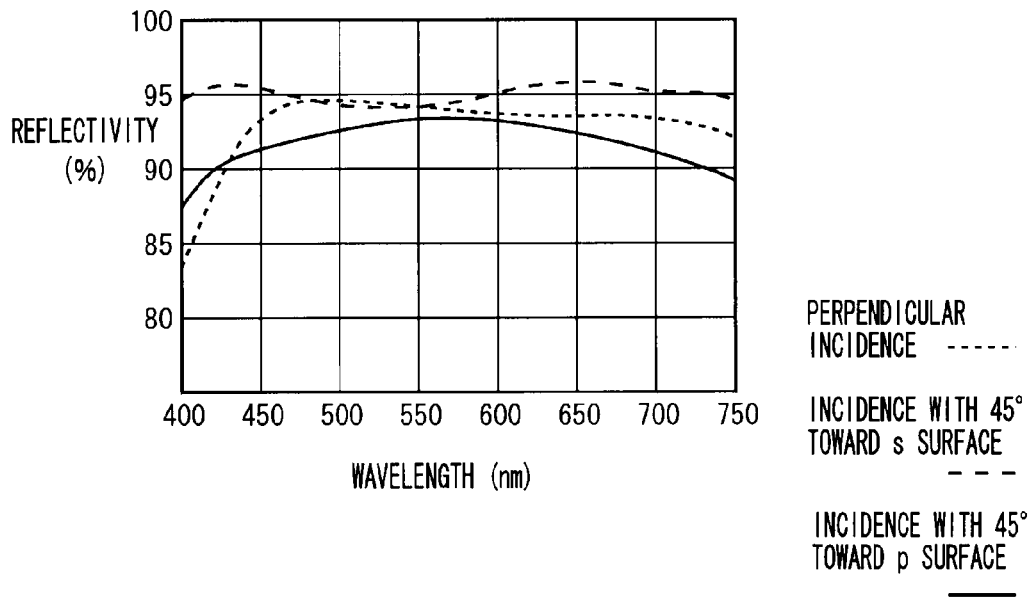

FIG. 15

|  | NUMBERS | DESCRIPTIONS |
|---|---|---|
| mt_b_r | 100 | DIAMETER [mm] OF SECOND OPTICAL WAVEGUID PORTION |
| mt_b_t | 1 | THICKNESS [mm] OF SECOND OPTICAL WAVEGUID PORTION |
| mt_b_p | c(0, 0) | COORDINATE [mm] OF CENTER OF SECOND OPTICAL WAVEGUID PORTION |
| mt_b | Air | NAME OF MATERIAL |
| mt_b_refraction | LUT | REFRACTIVE INDEX SET BASED ON mt_b VALUE WITH REFERRING TO TABLE 03: Air |
| mt_b_z | AL_011 | NAME OF REFLECTING MATERIAL |
| mt_b_z_LUT | LUT | REFLECTIVITY OF REFLECTING MATERIAL SET IN CONNECTION WITH WAVELENGTH AND INCIDENT ANGLE |

FIG. 16

|  | NUMBERS | DESCRIPTIONS |
|---|---|---|
| ray_cnt_end | 100 | UPPER LIMIT SET VALUE OF NUMBER OF DIVIDED INPUT LIGHT SOURCE |
| cross_cnt_end | 100 | MAXIMUM NUMBER OF REFLECTION / REFRACTION |
| circle_cnt_end | 360 | RESOLUTION AT LIGHT-ARRIVAL POINT ON OUTERMOST CIRCUMFERENCE |
| Fresnel_on | 1 | 1:FRESNEL CALCULATIONS FOR S-AND P-WAVES ARE CARRIED OUT<br>0:SCHLICK'S APPROXIMATION IS USED |

FIG. 17

| Initial_ray | x1 | y1 | z1 | i | j | k | level |
|---|---|---|---|---|---|---|---|
| 50 | 5 | 5 | 0 | −1 | 0 | 0 | 7.128713 |
| 49 | 5 | 4.9 | 0 | −1 | 0 | 0 | 7.128713 |
| 48 | 5 | 4.8 | 0 | −1 | 0 | 0 | 7.128713 |
| 47 | 5 | 4.7 | 0 | −1 | 0 | 0 | 7.128713 |
| 46 | 5 | 4.6 | 0 | −1 | 0 | 0 | 7.128713 |
| 45 | 5 | 4.5 | 0 | −1 | 0 | 0 | 7.128713 |
| 44 | 5 | 4.4 | 0 | −1 | 0 | 0 | 7.128713 |
| 43 | 5 | 4.3 | 0 | −1 | 0 | 0 | 7.128713 |
| 42 | 5 | 4.2 | 0 | −1 | 0 | 0 | 7.128713 |
| 41 | 5 | 4.1 | 0 | −1 | 0 | 0 | 7.128713 |
| 40 | 5 | 4 | 0 | −1 | 0 | 0 | 7.128713 |

⋮

| | | | | | | | |
|---|---|---|---|---|---|---|---|
| −40 | 5 | −4 | 0 | −1 | 0 | 0 | 7.128713 |
| −41 | 5 | −4.1 | 0 | −1 | 0 | 0 | 7.128713 |
| −42 | 5 | −4.2 | 0 | −1 | 0 | 0 | 7.128713 |
| −43 | 5 | −4.3 | 0 | −1 | 0 | 0 | 7.128713 |
| −44 | 5 | −4.4 | 0 | −1 | 0 | 0 | 7.128713 |
| −45 | 5 | −4.5 | 0 | −1 | 0 | 0 | 7.128713 |
| −46 | 5 | −4.6 | 0 | −1 | 0 | 0 | 7.128713 |
| −47 | 5 | −4.7 | 0 | −1 | 0 | 0 | 7.128713 |
| −48 | 5 | −4.8 | 0 | −1 | 0 | 0 | 7.128713 |
| −49 | 5 | −4.9 | 0 | −1 | 0 | 0 | 7.128713 |
| −50 | 5 | −5 | 0 | −1 | 0 | 0 | 7.128713 |

FIG. 20A

| address | REFLECTION OR REFRACTION OCCURRED AT POINTS OF INTERSECTION | | | | | | | B→Aon | ray_out_on |
|---|---|---|---|---|---|---|---|---|---|
| 0b000000 | initial | z | z | z | z | z | z | z | Null | Null |
| 0b000001 | refect | refect | z | z | z | z | z | z | | 1'b0 |
| 0b000010 | refect | refect | refect | refect | z | z | z | z | | 1'b1 |
| 0b000011 | refect | refect | refect | refect | refect | refect | refect | refect | | 1'b0 |

FIG. 20B

Cross_data

| address | | data | | | | | | | |
|---|---|---|---|---|---|---|---|---|---|
| cross_cnt_ad[6:1] | cross_cnt_ad[1] | B→Aon | x1 | y1 | z1 | i | j | k | level |
| 0b000000 | 1'b0 | 0 | 5 | 5 | 0 | -1 | 0 | 0 | 7.128713 |
| 0b000000 | 1'b1 | 0 | | | | | | | |
| 0b000001 | 1'b0 | 1 | | | | | | | |
| 0b000001 | 1'b1 | 1 | | | | | | | |
| 0b000010 | 1'b0 | 0 | | | | | | | |
| 0b000010 | 1'b1 | 0 | | | | | | | |
| 0b000011 | 1'b0 | 1 | | | | | | | |
| 0b000011 | 1'b1 | 1 | | | | | | | |

Cross_data

| address | | data | | | | | | | | | |
|---|---|---|---|---|---|---|---|---|---|---|---|
| cross_cnt_ad[6:1] | cross_cnt_ad[1] | B→Aon | x1 | y1 | z1 | i | j | k | level | lxyz | cross_type |
| 0b000000 | 1'b0 | 0 | 5 | 5 | 0 | -1 | 0 | 0 | 7.128713 | Null | Null |
| 0b000000 | 1'b1 | 0 | | | | | | | | | |
| 0b000001 | 1'b0 | 1 | | | | | | | | | |
| 0b000001 | 1'b1 | 1 | | | | | | | | | |
| 0b000010 | 1'b0 | 0 | | | | | | | | | |
| 0b000010 | 1'b1 | 0 | | | | | | | | | |
| 0b000011 | 1'b0 | 1 | | | | | | | | | |
| 0b000011 | 1'b1 | 1 | | | | | | | | | |

Cross_data

| address | | data | | | | | | | | | |
|---|---|---|---|---|---|---|---|---|---|---|---|
| cross_cnt_ad[6:1] | cross_cnt_ad[1] | B→Aon | x1 | y1 | z1 | i | j | k | level | \|xyz\| | cross_type |
| 0b000000 | 1'b0 | 0 | 5 | 5 | 0 | −1 | 0 | 0 | 7.128713 | Null | Null |
| 0b000000 | 1'b1 | 0 | | | | | | | | | |
| 0b000001 | 1'b0 | 1 | | | | | | | | | |
| 0b000001 | 1'b1 | 1 | | | | | | | | | |
| 0b000010 | 1'b0 | 0 | | | | | | | | | |
| 0b000010 | 1'b1 | 0 | | | | | | | | | |
| 0b000011 | 1'b0 | 1 | | | | | | | | | |
| 0b000011 | 1'b1 | 1 | | | | | | | | | |

Cross_data

| address | | data | | | | | | | | | | | | | |
|---|---|---|---|---|---|---|---|---|---|---|---|---|---|---|---|
| cross_cnt_ad[6:1] | cross_cnt_ad[1] | B→Aon | x1 | y1 | z1 | i | j | k | level | \|xyz\| | cross_type | XYRp-Rs | XYTp-Ts | YZRp-Rs | YZTp-Ts |
| 0b000000 | 1'b0 | 0 | 5 | 5 | 0 | −1 | 0 | 0 | 7.128713 | Null | Null | Null | Null | Null | Null |
| 0b000000 | 1'b1 | 0 | | | | | | | | | | | | | |
| 0b000001 | 1'b0 | 1 | | | | | | | | | | | | | |
| 0b000001 | 1'b1 | 1 | | | | | | | | | | | | | |
| 0b000010 | 1'b0 | 0 | | | | | | | | | | | | | |
| 0b000010 | 1'b1 | 0 | | | | | | | | | | | | | |
| 0b000011 | 1'b0 | 1 | | | | | | | | | | | | | |
| 0b000011 | 1'b1 | 1 | | | | | | | | | | | | | |

FIG. 28A

Cross_data

| address | | data | | | | | | | | | | | | |
|---|---|---|---|---|---|---|---|---|---|---|---|---|---|---|
| cross_cnt_ad[6:1] | cross_cnt_ad[1] | B→Aon | x1 | y1 | z1 | i | j | k | level | \|xyz\| | cross_type | XYRp-Rs | XYTp-Ts | YZRp-Rs | YZTp-Ts |
| 0b000000 | 1'b0 | 0 | 5 | 5 | 0 | -1 | 0 | 0 | 7.128713 | Null | Null | Null | Null | Null | Null |
| 0b000000 | 1'b1 | 0 | | | | | | | | | | | | | |
| 0b000001 | 1'b0 | 1 | | | | | | | | | | | | | |
| 0b000001 | 1'b1 | 1 | | | | | | | | | | | | | |
| 0b000010 | 1'b0 | 0 | | | | | | | | | | | | | |
| 0b000010 | 1'b1 | 0 | | | | | | | | | | | | | |
| 0b000011 | 1'b0 | 1 | | | | | | | | | | | | | |
| 0b000011 | 1'b1 | 1 | | | | | | | | | | | | | |

FIG. 28B

Z_Cross_data

| address | | data | | | | | | | | | | | | |
|---|---|---|---|---|---|---|---|---|---|---|---|---|---|---|
| cross_cnt_ad[6:1] | cross_cnt_ad[1] | B→Aon | x1 | y1 | z1 | i | j | k | level | \|xyz\| | cross_type | XYRp-Rs | XYTp-Ts | YZRp-Rs | YZTp-Ts |
| 0b000000 | 1'b0 | 0 | 5 | 5 | 0 | -1 | 0 | 0 | 7.128713 | Null | Null | Null | Null | Null | Null |
| 0b000000 | 1'b1 | 0 | | | | | | | | | | | | | |
| 0b000001 | 1'b0 | 1 | | | | | | | | | | | | | |
| 0b000001 | 1'b1 | 1 | | | | | | | | | | | | | |
| 0b000010 | 1'b0 | 0 | | | | | | | | | | | | | |
| 0b000010 | 1'b1 | 0 | | | | | | | | | | | | | |
| 0b000011 | 1'b0 | 1 | | | | | | | | | | | | | |
| 0b000011 | 1'b1 | 1 | | | | | | | | | | | | | |

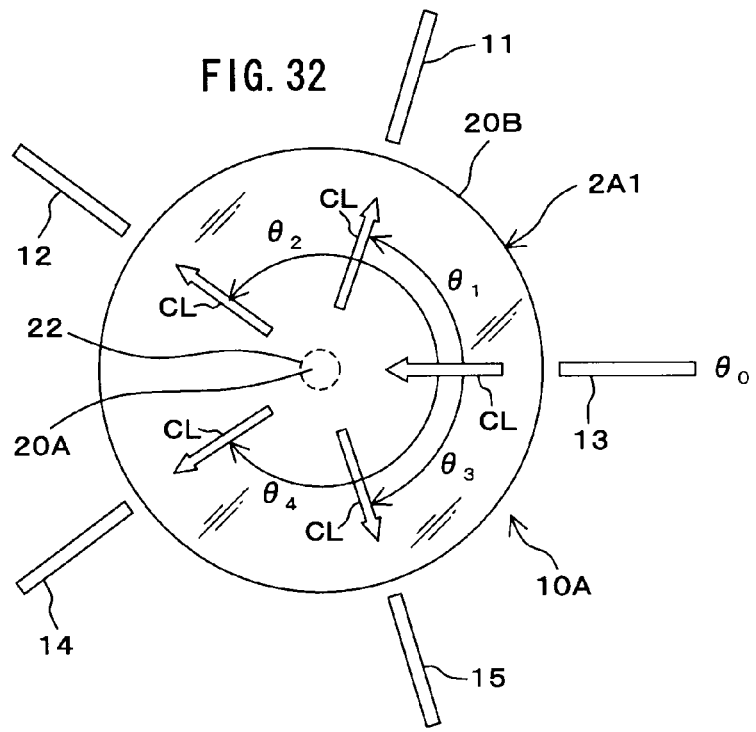
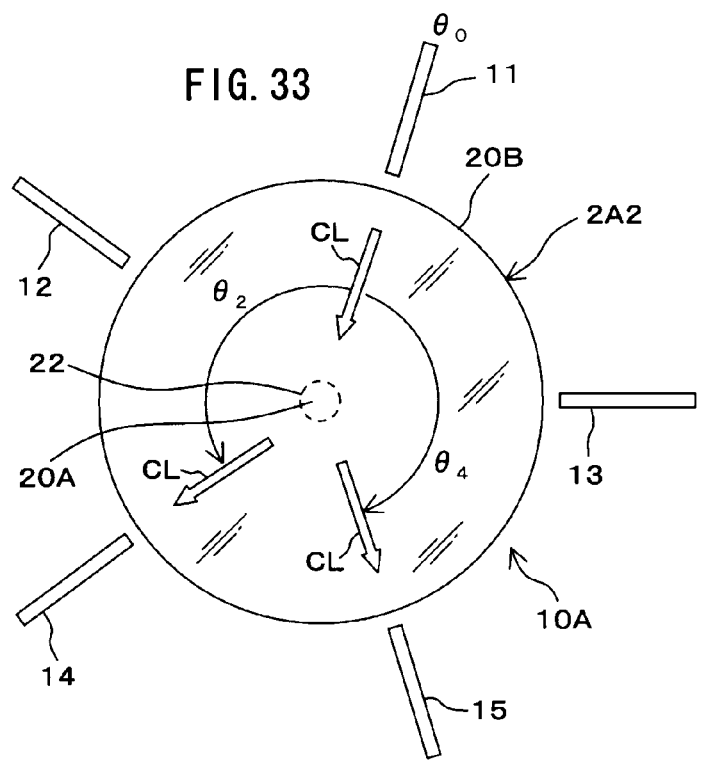

FIG. 40

| OPTICAL WAVEGUIDES | | | | | | |
|---|---|---|---|---|---|---|
| (4) | (3) | (2) | (1) | | | |
| | | | TX | 13 | REMOTE-CONTROL-SIGNAL-RECEIVING | FUNCTIONAL BOARDS |
| | | | RX | 11 | IMAGE INPUT | |
| | | | RX | 14 | ZOOM | |
| | | | RX | 15 | DRC | |
| | | | RX | 12 | IMAGE OUTPUT | |

OPTICAL SELECTOR SWITCH AND SIGNAL-PROCESSING APPARATUS

CROSS REFERENCES TO RELATED APPLICATIONS

The present invention contains subject matter related to Japanese Patent Applications JP2008-055569 and JP2008-234011 filed in the Japanese Patent Office on Mar. 5, 2008 and Sep. 11, 2008, respectively, the entire contents of which being incorporated herein by reference.

BACKGROUND OF THE INVENTION

1. Field of the Invention

The present invention relates to an optical selector switch and a signal-processing apparatus including the optical selector switch, which is capable of performing a signal transmission between a transmitting side and a receiving side according to a point-to-multipoint system, a multipoint-to-point system or a multipoint-to-multipoint system. It particularly relates to an optical selector and the like which have a function of reflecting a part of light that is incident on a center portion of an optical waveguide and refracting a part of the light to generate a optical path or optical paths on a desired direction or desired directions, so that the signal transmission can be realized without any attenuation of the light.

2. Description of Related Art

A multistage optical selector switch according to a multipoint-to-multipoint system has studied and developed accompanying an expansion of long-distance multiplex communication technology using an optical cable.

Specifically, there have existed an optical switch of optical-fiber-driving type that changes optical paths by directly driving a fiber with a magnetized cover by means of electromagnet, an optical switch of micro mirror type that changes optical paths by changing a reflection angle of light using an MEM mirror, an optical switch of wave guide type that switches the light on or off by, after separating light into its two spectral components that are different in a phase, performing a phase inversion on one spectral component of the light and interfering with it to original light, and a multistage optical selector switch using an optical sheet bus. The multistage optical switch according to a multipoint-to-multipoint system has been configured based on these technologies to switch a communication signal.

Such an optical switch, however, is expensive and has a large cabinet so that it is unsuitable for built-in to any general consumer appliances.

Japanese Patent Application Publication No. H10-123350 has proposed a system such that functions of products have been assembled into modules and the functions may be easily added and changed on the optical sheet bus.

In such a past optical sheet bus, scattering members are dispersed and disposed over an optical transmission layer and incident signal light spreads and is transmitted, which enables a signal transmission to be realized between plural boards that are connected to the optical sheet bus.

SUMMARY OF THE INVENTION

The past optical sheet bus, however, has scattering members dispersed over the optical transmission layer so that the transmitted light is considerably attenuated, by which it is difficult to transmit the light signal securely from a circuit board of transmission side to a desired board of receiving side.

It is desirable to provide an optical selector switch and a signal-processing apparatus including the optical selector switch, which are capable of transmitting the light signal securely from single or multiple light-emitting units to single or multiple light-receiving units without any attenuation of the transmitted light.

According to an embodiment of the present invention, there is provided an optical selector switch containing an optical waveguide, at least one light-emitting unit and at least one light-receiving unit. The optical waveguide that includes a first optical waveguide portion having a first light-transmissivity, a second optical waveguide portion having a second light-transmissivity and being provided over a whole side surface of the first optical waveguide portion, reflecting members that reflect light and are positioned on both upper and lower surfaces of the first optical waveguide portion and the second optical waveguide portion so as to be opposed to each other with the reflecting members exposing an outer circumference of the second optical waveguide portion, and a light-dividing device that reflects a predetermined ratio of the light and transmits the remains thereof, the light-dividing device being positioned at a boundary of the first and second optical waveguide portions. The above-mentioned at least one light-emitting unit emits the light toward the first optical waveguide portion of the optical waveguide, the light-emitting unit being positioned with a predetermined angle along the outer circumference of the second optical waveguide portion of the optical waveguide. The above-mentioned at least one light-receiving unit receives the light which is incident to the first optical waveguide portion of the optical waveguide from the light-emitting unit, the light-receiving unit being positioned with a predetermined angle along the outer circumference of the second optical waveguide portion of the optical waveguide, based on a directivity due to an angle of the incident light to the first optical waveguide portion of the optical waveguide. The incident light to the first optical waveguide portion of the optical waveguide from a single angle or separate angles is emitted radially toward the circumference of the second optical waveguide portion of the optical waveguide with the incident light having at least one of directivity.

In the embodiment of the optical selector switch according to the invention, the light-dividing device reflects a part of the light that is incident to the first optical waveguide portion of the optical waveguide from the light-emitting unit (s) and transmits the remains thereof to refract it based on a difference in the first light-transmissivity of the first optical waveguide and the second light-transmissivity of the second optical waveguide.

In the optical waveguide, the reflection and/or the refraction at the boundary of the first and second optical waveguide portions allows optical path(s) to be generated so that the incident light to the first optical waveguide portion of the optical waveguide is emitted radially toward the circumference of the second optical waveguide portion of the optical waveguide with the incident light having at least one of directivity. Based on such directivity of the incident light, at least one light-emitting unit and at least one light-receiving unit are positioned along the outer circumference of the second optical waveguide portion of the optical waveguide, whereby restraining the transmitted light between the light-emitting unit (s) and the light-receiving unit (s) from being attenuated with a simple configuration thereof.

According to another embodiment of the present invention, there is provided a signal-processing apparatus containing at least one optical waveguide and plural functional boards. Each of the optical waveguide includes a first optical waveguide portion having a first light-transmissivity, a second optical waveguide portion having a second light-transmissivity and being provided over a whole side surface of the first optical waveguide portion, reflecting members that reflect light and are positioned on both upper and lower surfaces of the first optical waveguide portion and the second optical waveguide portion so as to be opposed to each other with the reflecting members exposing an outer circumference of the second optical waveguide portion, and a light-dividing device that reflects a predetermined ratio of the light and transmits the remains thereof, the light-dividing device being positioned at a boundary of the first and second optical waveguide portions, wherein the incident light to the first optical waveguide portion of the optical waveguide from a single angle or separate angles is emitted radially toward the circumference of the second optical waveguide portion of the optical waveguide with the incident light having at least one of directivity. Each of the plural functional boards has a light-emitting unit that emits the light toward the first optical waveguide portion of the optical waveguide and a light-receiving unit that receives the light which is incident to the first optical waveguide portion of the optical waveguide from the light-emitting unit. The plural functional boards are positioned with a predetermined angle along the outer circumference of the second optical waveguide portion of the optical waveguide, based on directivity due to an angle of the incident light to the first optical waveguide portion of the optical waveguide.

In the embodiment of the signal-processing apparatus according to the invention, the light-dividing device reflects a part of the light that is incident to the first optical waveguide portion of the optical waveguide from any of the light-emitting units of the plural functional boards based on the incident angle thereof and transmits the remains thereof to refract it based on difference in the first light-transmissivity of the first optical waveguide and the second light-transmissivity of the second optical waveguide.

In the optical waveguide, the reflection and/or the refraction at the boundary of the first and second optical waveguide portions allows optical path(s) to be generated so that the incident light to the first optical waveguide portion of the optical waveguide is emitted radially toward the circumference of the second optical waveguide portion of the optical waveguide with the incident light having at least one of directivity. Based on such directivity of the incident light, the plural functional boards are positioned along the outer circumference of the second optical waveguide portion of the optical waveguide, whereby restraining the transmitted light between the plural functional boards from being attenuated.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 1A and 1B are schematic diagrams showing an embodiment of an optical selector switch according to the invention;

FIGS. 2A through 2E are plane views of a first optical waveguide portion of an optical waveguide each for showing an example of a shape of the first optical waveguide portion;

FIG. 11 is a table showing an example of wavelengths of light sources to be used in the laser diode;

FIG. 12 is a table showing an example of set initial values relating to properties of the first optical waveguide portion;

FIGS. 13A and 13B are tables showing relationships between optical waveguide materials and refractive indexes;

FIGS. 14A and 14B are graphs each showing reflectivities of reflecting material;

FIG. 15 is a table showing an example of set values relating to various kinds of properties of the second optical waveguide portion;

FIG. 16 is a table showing an example of set values relating to threshold values that are set for reducing calculation costs;

FIG. 17 is a table showing an example of pieces of arrangement information of light rays emitted from the input light source;

FIGS. 20A and 20B are tables each showing an example of the generation of the addresses to be assigned to the reflected light and the refracted light;

FIGS. 28A and 28B are tables each showing an example of a result of the calculation of the reflection on Z-plane;

FIG. 32 is a schematic diagram showing an example of signal paths in a first optical waveguide;

FIG. 33 is a schematic diagram showing an example of signal paths in a second optical waveguide;

FIG. 40 is a diagram showing an example of a change-over of the signal paths.

DESCRIPTION OF THE PREFERRED EMBODIMENTS

Figure 3A:
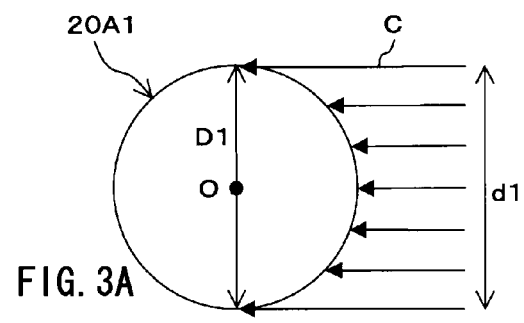
FIGS. 3A through 3F are explanation diagrams each illustrating a relationship of the shape of the first optical waveguide portion and the incident direction of the light.

The following will describe embodiments of an optical selector switch and a signal-processing apparatus using the same relating to the invention with reference to drawings.

[Configuration of an Embodiment of the Optical Selector Switch]

FIGS. 1A and 1B show an embodiment of an optical selector switch according to the invention. FIG. 1A is a schematically plane view of the embodiment of the optical selector switch according to the invention. FIG. 1B is a schematically cross-sectional side view of the embodiment of the optical selector switch according to the invention, taken along the A-A lines shown in FIG. 1A.

The embodiment of the optical selector switch 1A according to the invention contains an optical waveguide 2A of plane type to which light is incident from an optional direction and from which the light with directivities is emitted, a laser diode 3 emitting the light, and photodetectors 4 each receiving the light.

The optical waveguide 2A includes a first optical waveguide portion 20A composed of optical waveguide material having a first light-transmissivity at a predetermined wavelength region, and a second optical waveguide portion 20B composed of optical waveguide material having a second light-transmissivity, which is different from the first light-transmissivity.

The first optical waveguide portion 20A is composed of transparent material, for example, glass material (BK7), having the first light-transmissivity at the predetermined wavelength region. The second optical waveguide portion 20B is composed of an air layer in this embodiment.

The first optical waveguide portion 20A has a shape like, for example, a column or a regular polygon column. A beam splitter 22 is positioned at a boundary of the first and second optical waveguide portions 20A and 20B.

The beam splitter 22 constitutes light-dividing device and is formed as a half mirror at an outer circumference of the first optical waveguide portion 20A facing the second optical waveguide portion 20B of the air layer. The beam splitter 22 has a predetermined reflectivity and a predetermined transmissivity on light that is incident to the first optical waveguide portion 20A from a side of the second optical waveguide portion 20B.

The optical waveguide 2A also includes reflecting members 23, 23 that are positioned on both the upper and lower surfaces of the first optical waveguide portion 20A and the second optical waveguide portion 20B. Each of the reflecting members 23 has a disk shape, at an almost center of which the first optical waveguide portion 20A is arranged. The reflecting members 23 expose an outer circumference of the second optical waveguide portion 20B along the whole circumference thereof when the second optical waveguide portion 20B is not composed of an air layer. The first optical waveguide portion 20A and the second optical waveguide portion 20B are held between the reflecting members 23 with the reflecting surfaces thereof that reflect the light being faced to each of the upper and lower planes of the first optical waveguide portion 20A and the second optical waveguide portion 20B of the air layer.

Thus, the optical waveguide 2A enables the light to be emitted and received at its optional positions around the circumference thereof along the outer circumference of the second optical waveguide portion 20B, thereby emitting or receiving the light to or from the outer circumference of the second optical waveguide portion 20B. The reflecting members 23 reflect the light that is incident to the second optical waveguide portion 20B so that the light is propagated through the second optical waveguide portion 20B.

The beam splitter 22 that is provided on the outer circumference of the first optical waveguide portion 20A reflects a part of the light propagated through the second optical waveguide portion 20B based on an incident angle thereof. A part of the light is refracted based on a difference in the refractive indexes of the first and second optical waveguide portions 20A and 20B, so that the light with predetermined directivities is emitted from the first optical waveguide portion 20A.

The light with the predetermined directivities, which has emitted from the first optical waveguide portion 20A, is then propagated through the second optical waveguide portion 20B, so that it is emitted from the outer circumference of the second optical waveguide portion 20B.

Accordingly, when the light is incident into the first optical waveguide portion 20A from a predetermined position along the outer circumference of the second optical waveguide portion 20B in the optical waveguide 2A, the first optical waveguide portion 20A emits the light with the predetermined directivities, so that the photodetectors 4 can receive the light efficiently at predetermined positions along the outer circumference of the second optical waveguide portion 20B.

The laser diode 3 constitutes a light-emitting unit and is positioned at the predetermined position along the circumference of the optical waveguide 2A with the light-emitting portion thereof, which is not shown, being opposed to the outer circumference of the second optical waveguide portion 20B. The photodetectors 4 constitute light-receiving units and are positioned at positions in which the light has higher directivities along the circumference of the optical waveguide 2A with their light-receiving portions, which is not shown, being opposed to the outer circumference of the second optical waveguide portion 20B.

The laser diode 3 and the photodetectors 4 are positioned so as to be away from a center of the first optical waveguide portion 20A, which is also a center of the optical waveguide 2A, by the same distance.

[Example of Operation of Embodiment of Optical Selector Switch]

The following will describe an operation of this embodiment of the optical selector switch 1A with reference to FIGS. 1A and 1B. In the optical waveguide 2A, when the light is incident to the first optical waveguide portion 20A from the laser diode 3 at a position of an angle $\theta_0$, the light has any predetermined directivities of, for example, angles $\theta_1, \theta_2, \theta_3, \theta_4$.

Accordingly, in the optical selector switch 1A, the laser diode 3 is arranged at a position corresponding to the position of the angle $\theta_0$, and the photodetectors 4 are arranged at positions corresponding to the positions of the angles $\theta_1, \theta_2, \theta_3, \theta_4$. In this embodiment, it is estimated that the angles $\theta_1$ and $\theta_3$ respectively have predetermined angles within a range of 0 through 90 degrees with respect to the angle $\theta_0$, and that the angles $\theta_2$ and $\theta_4$ respectively have predetermined angles within a range of 90 through 180 degrees with respect to the angle $\theta_0$.

The light CL which the laser diode 3 emits to the first optical waveguide portion 20A of the optical waveguide 2A is reflected by the reflecting members 23 and propagated through the second optical waveguide portion 20B so that the light CL is incident to the first optical waveguide portion 20A.

The beam splitter 22 provided on the outer circumference of the first optical waveguide portion 20A reflects a part of the light CL that is incident to the first optical waveguide portion 20A based on its incident angle. Such reflection by the beam splitter 22 enables the predetermined directivities to be given to the light CL in the optical waveguide 2A within a range of plus or minus 90 degrees with respect to the angle $\theta_0$ that is an incident position of the light CL.

On the other hand, the other part of the light CL that is incident to the first optical waveguide portion 20A is transmitted through the beam splitter 22 provided on the outer circumference of the first optical waveguide portion 20A. This enables the predetermined directivities to be given to the light CL in the optical waveguide 2A within a range from plus or minus 90 degrees to plus or minus 180 degrees with respect to the angle $\theta_0$ that is an incident position of the light CL by the refraction based on a difference in the refractive indexes of the first and second optical waveguide portions 20A and 20B for the most part.

Accordingly, the light CL having the predetermined directivities, which has been emitted by the first optical waveguide portion 20A, is propagated through the second optical waveguide portion 20B and is emitted from the outer circumference of the second optical waveguide portion 20B. The photodetectors 4 respectively receive the emitted light CL.

The photodetectors 4 are positioned due to the directivities of the light in the optical waveguide 2A. In the other words, the photodetectors 4 are positioned at positions each having a high level of the light that is able to be received or at positions of which the light that is able to be received has the almost same level, around the circumference of the optical waveguide 2A. This enables the light emitted from the laser diode 3 to be efficiently received by the photodetectors 4.

It is to be noted that although a case where four predetermined directivities have been given to the light when the light is incident from one way has been described in the embodiment shown in FIGS. 1A and 1B, a plurality of predetermined directivities other than four predetermined directivities can be given to the light when the light is incident from one way. Further, one or more predetermined directivities can be given to the light when the light is incident from plural ways.

[Shape of First Optical Waveguide Portion]

FIGS. 2A through 2E respectively show examples of the shapes of the first optical waveguide portion 20A of the optical waveguide 2A. The following will describe the shapes of the first optical waveguide portion 20A of the optical waveguide 2A shown in FIGS. 1A and 1B.

The first optical waveguide portion 20A1 shown in FIG. 2A has a circular sectional shape and a shape like a column. The beam splitter 22 composed of half mirrors is formed on the circumference of the column.

The first optical waveguide portion 20A2 shown in FIG. 2B has a heptagonal sectional shape and a shape like a regular polygon column and the first optical waveguide portion 20A3 shown in FIG. 2C has an octagonal sectional shape and a shape like a regular polygon column. The first optical waveguide portion 20A2 shown in FIG. 2B is an example of the first optical waveguide portion having a sectional shape of odd-numbered vertexes and the first optical waveguide portion 20A3 shown in FIG. 2C is an example of the first optical waveguide portion having a sectional shape of even-numbered vertexes. The beam splitter 22 composed of half mirrors is formed on surfaces of the regular polygon column in each of these first optical waveguide portions 20A2 and 20A3. It is to be noted that the polygon column has at least three surfaces, preferably, at least five surfaces.

The first optical waveguide portion 20A4 shown in FIG. 2D and the first optical waveguide portion 20A5 shown in FIG. 2E respectively are composed of a combination of triangular prisms 200 made of, for example, glass material so as to have regular polygon columns having a heptagonal section and an octagonal section, respectively. The first optical waveguide portion 20A4 shown in FIG. 2D is an example of the first optical waveguide portion having a sectional shape of odd-numbered vertexes and the first optical waveguide portion 20A5 shown in FIG. 2E is an example of the first optical waveguide portion having a sectional shape of even-numbered vertexes.

In the first optical waveguide portion 20A4 shown in FIG. 2D and the first optical waveguide portion 20A5 shown in FIG. 2E, the triangular prisms 200 are adhered to each other on a line connecting a center O of the regular polygon column and a vertex BO of a sectional shape of the regular polygon column. The beam splitter 22 composed of half mirrors is formed on adhered surfaces 201, i.e., side wall surfaces, of each of these triangular prisms 200.

[Incident Direction of Light with respect to First Optical Waveguide Portion]

FIGS. 3A through 3F illustrate a relationship of the shapes of the first optical waveguide portion of the optical waveguide and the incident direction of the light. As shown in FIG. 3A, in the first optical waveguide portion 20A1 having a circular sectional shape, parallel light C having a spot diameter d1 that is the same diameter as a diameter D1 of the first optical waveguide portion 20A1 is incident to a center O of the first optical waveguide portion 20A1.

Figure 3D:
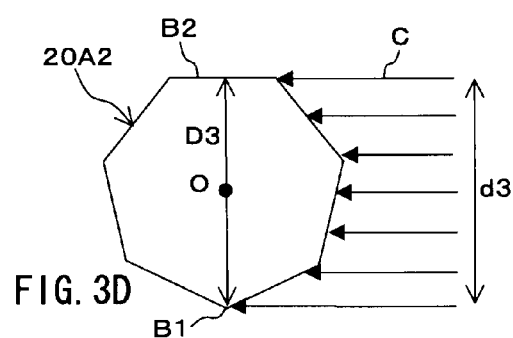
Figure 3B:
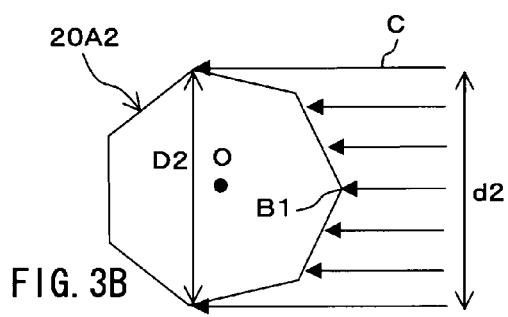

As shown in FIG. 3B, in the first optical waveguide portion 20A2 having a shape like a regular polygon column that has a section of odd-numbered vertexes, parallel light C having a spot diameter d2 that is the same distance as a longest distance (width) D2 between the vertexes in a section of the regular polygon column of the first optical waveguide portion 20A2 is incident to a center O of the first optical waveguide portion 20A2 from a vertex B1 thereof.

Figure 3E:
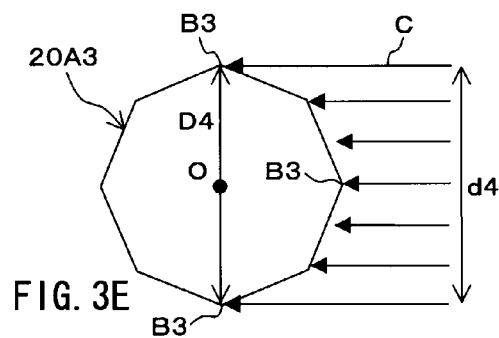
Figure 3C:
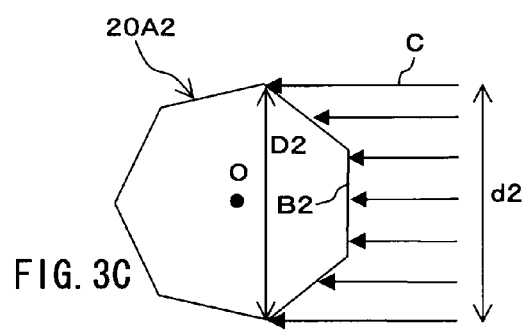

As shown in FIG. 3C, the parallel light C having the spot diameter d2 that is the same distance as the longest distance (width) D2 between the vertexes in the section of the regular polygon column of the first optical waveguide portion 20A2 is incident at almost right angles to the center O of the first optical waveguide portion 20A2 from a surface B2 of the regular polygon column.

As shown FIG. 3D, the parallel light C having the spot diameter d3 that is the same distance as a distance (width) D3 between the vertex B1 in the section of the regular polygon column of the first optical waveguide portion 20A2 and a corresponding surface B2 thereof is incident to the center O of the first optical waveguide portion 20A2 almost in parallel with the surface B2 of the regular polygon column of the first optical waveguide portion 20A2.

As shown in FIG. 3E, in the first optical waveguide portion 20A3 having a shape like a regular polygon column that has a section of even-numbered vertexes, the parallel light C having a spot diameter d4 that is the same distance as a distance (width) D4 between the opposite vertexes B3, B3 in a section of the regular polygon column of the first optical waveguide portion 20A3 is incident to the center O of the first optical waveguide portion 20A3 from a vertex B3 in a section of the regular polygon column of the first optical waveguide portion 20A3.

Figure 3F:
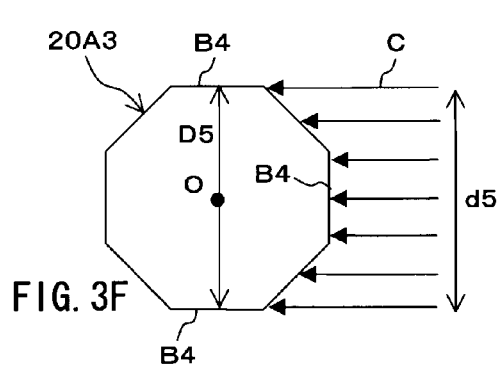

As shown in FIG. 3F, the parallel light C having the spot diameter d5 that is the same distance as a distance (width) D5 between the opposite surfaces B4, B4 in the section of the regular polygon column of the first optical waveguide portion 20A3 is incident to the center O of the first optical waveguide portion 20A3 from a surface B4 in the section of the regular polygon column of the first optical waveguide portion 20A3.

[Relationship between Diameter or the like of First Optical Waveguide Portion and Spot Diameter of Incident Light]

FIGS. 4A through 4E show examples of adjustment mechanisms each adjusting a spot diameter of the light which is incident to the first optical waveguide portion of the optical waveguide. The following will describe a relationship between a diameter of the first optical waveguide portion 20A of the optical waveguide 2A and a spot diameter of the light that is incident to the first optical waveguide portion 20A. It is to be noted that in FIGS. 4A through 4E, cases where the first optical waveguide portion 20A has a shape like a column are illustrated.

Figure 4A:
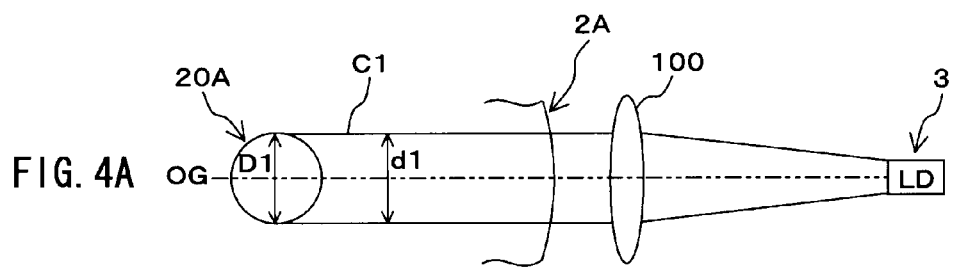
FIGS. 4A through 4E are schematic diagrams showing examples of adjustment mechanisms that adjust a spot diameter of light which is incident to the first optical waveguide portion of the optical waveguide.
Figure 4B:
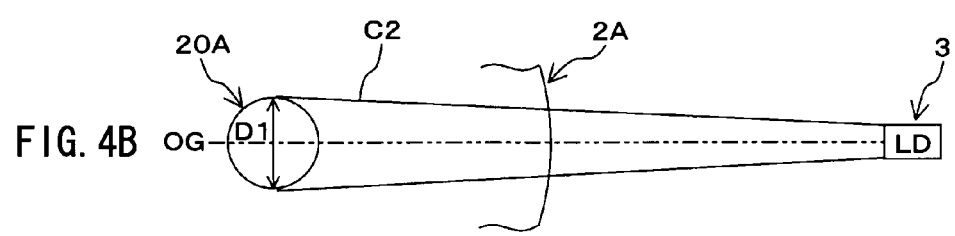

In FIGS. 4A and 4B, a diameter D1 of the first optical waveguide portion 20A is equal to the spot diameter d1 of the light that is incident to the first optical waveguide portion 20A. In FIG. 4A, a lens 100 collimates the light emitted from the laser diode 3 so that parallel light C1 having the spot diameter that is the same diameter as the diameter D1 of the first optical waveguide portion 20A is incident to the first optical waveguide portion 20A.

In FIG. 4B, light C2 which is emitted from the laser diode 3 at a predetermined emitting angle and has the spot diameter that is the same diameter as the diameter D1 of the first optical waveguide portion 20A is incident to the first optical waveguide portion 20A. In FIGS. 4A and 4B, an axis OG passing through the center of the first optical waveguide portion 20A agrees with an optical axis of the light that is incident to the first optical waveguide portion 20A.

Figure 4C:
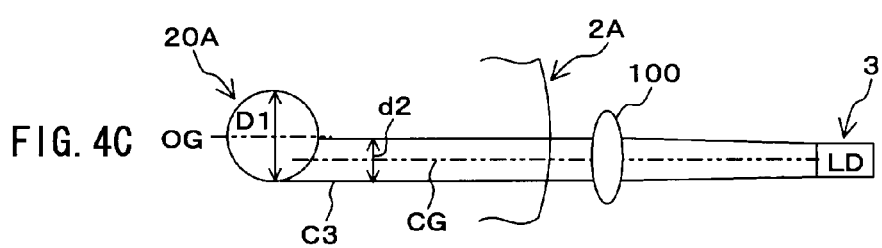
Figure 4D:
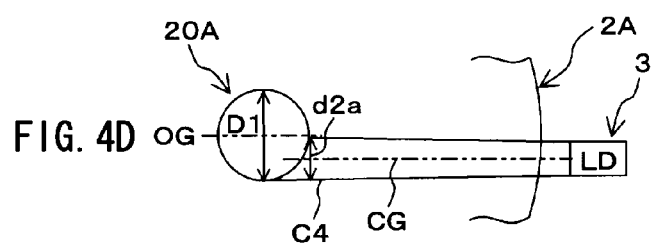
Figure 4E:
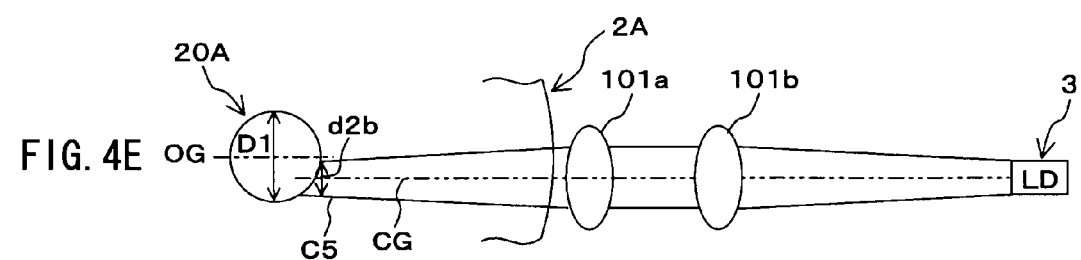

In FIGS. 4C, 4D and 4E, the spot diameter d2 of the light that is incident to the first optical waveguide portion 20A is smaller than the diameter D1 of the first optical waveguide portion 20A. In FIG. 4C, the lens 100 collimates light emitted from the laser diode 3 so that parallel light C3 having the spot diameter d2 that is smaller than the diameter D1 of the first optical waveguide portion 20A is incident to the first optical waveguide portion 20A.

In FIG. 4D, light C4 which is emitted from the laser diode 3 at a predetermined emitting angle and has the spot diameter d2a that is smaller than the diameter D1 of the first optical waveguide portion 20A is incident to the first optical waveguide portion 20A.

In FIG. 4E, lenses 100a, 100b condense light emitted from the laser diode 3 at a predetermined emitting angle so that the light C5 having the spot diameter d2b that is smaller than the diameter D1 of the first optical waveguide portion 20A is incident to the first optical waveguide portion 20A.

In FIGS. 4C, 4D and 4E, an axis OG passing through the center of the first optical waveguide portion 20A is deviated from an optical axis CG of the light that is incident to the first optical waveguide portion 20A. For example, the light is incident thereto with the optical axis CG of the light that is incident to the first optical waveguide portion 20A being deviated to a side from the center of the first optical waveguide portion 20A. It is to be noted that when the lens 100 is used for collimating the light, the collimated light passing through the lens 100 may be reached to the first optical waveguide portion 20A after the collimated light has passed through an optional point on the axis OG, which is not shown.

As shown in FIGS. 4A and 4B, if the diameter D1 of the first optical waveguide portion 20A is equal to the spot diameter of the light that is incident to the first optical waveguide portion 20A and the axis passing through the center of the first optical waveguide portion 20A agrees with the optical axis of the light that is incident to the first optical waveguide portion 20A, the directivities of the light emitted from the optical waveguide 2A have a circular symmetry in a radial direction of the first optical waveguide portion 20A with respect to the optical axis of the light.

In a case shown in FIGS. 1A and 1B, the laser diode 3 is positioned at the angle $\theta_0$ with respect to the optical waveguide 2A and if the light has predetermined directivities of the angles $\theta_1, \theta_2, \theta_3,$ and $\theta_4$, with respect to the angle $\theta_0$, the angles $\theta_1$ and $\theta_3$ are equal to each other and the angles $\theta_2$ and $\theta_4$ are equal to each other.

On the other hand, as shown in FIGS. 4C, 4D and 4E, if the spot diameter of the light that is incident to the first optical waveguide portion 20A is smaller than the diameter of the first optical waveguide portion 20A and the axis passing through the center of the first optical waveguide portion 20A is deviated from the optical axis of the light that is incident to the first optical waveguide portion 20A, the directivities of the light emitted from the optical waveguide 2A have asymmetry in a radial direction of the first optical waveguide portion 20A with respect to the optical axis of the light.

[Calculation Method of Directivities in Optical Waveguide]

The directivities of the light in the optical waveguide 2A can be obtained by calculating an optical path of the light that is incident to the first optical waveguide portion 20A and is reflected by the beam splitter 22 provided at a circumference of the first optical waveguide portion 20A, and an optical path of the light that is transmitted through the beam splitter 22 and is refracted.

The following parameters are available for calculation of the optical paths in the optical waveguide 2A. It is to be noted that in the following calculation, a case where parallel light emitted from a point light source is incident to a middle point of each surface of the polygon column will be described.

[Assumption]

The assumption is set as follows:
(1) Refractive index of material of the first optical waveguide portion 20A is set to Nc;

(2) Refractive index of material of the second optical waveguide portion 20B is set to Na;
(3) Wavelength of the laser diode 3 as the light source is set to λ (nm);
(4) Reflectivity of the beam splitter 22 provided on the outer circumference of the first optical waveguide portion 20A is set to Ref; and
(5) Shape of the first optical waveguide portion 20A is set to a regular polygon column, which is inscribed in a circle with a radius r, having a section of n pieces of vertexes (at least three vertexes)

[Circle with Radius r]

Figure 5:
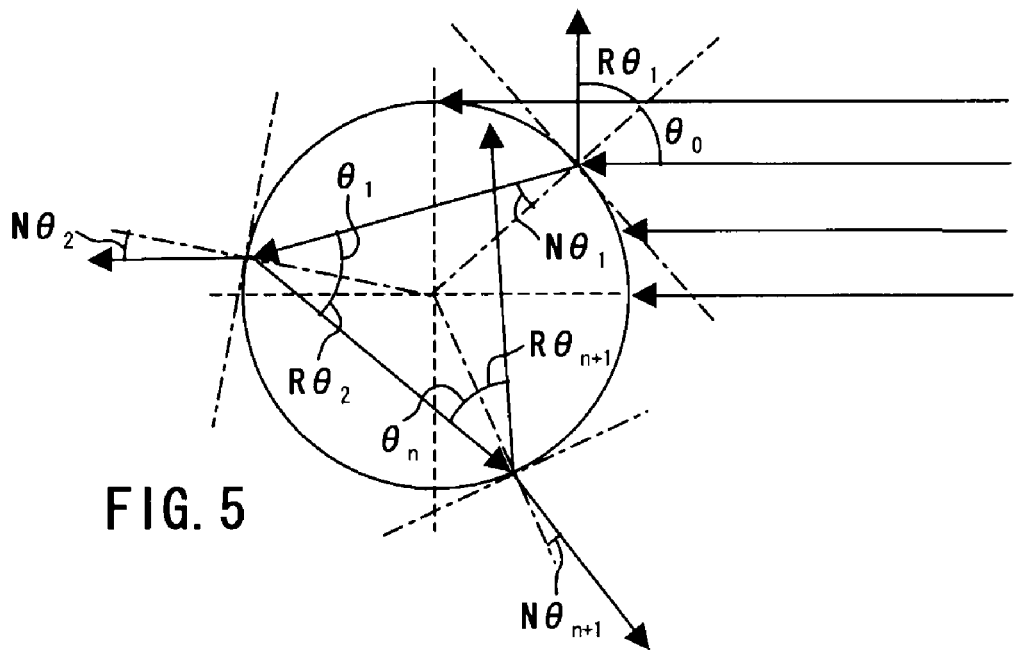
FIG. 5 is a diagram illustrating an example of optical paths of the light which is incident to the first optical waveguide portion with a shape like a column.

FIG. 5 illustrates an example of optical paths of the light that is incident to the first optical waveguide portion 20A having a shape like a column. The following will describe a case where the shape of the first optical waveguide portion 20A is set to a regular polygon column having a section of n pieces of vertexes (n=∞), namely, a column having a section with a circle of a radius r. It is to be noted that the circle with the radius r is obtained by an equation as follows:

$$X^2 + y^2 = r^2 \quad (1)$$

It is assumed that an incident angle of the light that is incident to the first optical waveguide portion 20A from the outside is $\theta_0$ and a reflection angle of the light that is reflected by the beam splitter 22 provided at the outer circumference of the first optical waveguide portion 20A is $R\theta_1$. It is assumed that a refraction angle of the light that is transmitted through the beam splitter 22 based on the difference in the refractive indexes of the first and second optical waveguide portions 20A and 20B is $N\theta_1$.

It is also assumed that an incident angle of the light that is propagated through the inside of the first optical waveguide portion 20A with respect to the outer circumference of the first optical waveguide portion 20A is $\theta_1$ and a reflection angle of the light that is reflected in the inside of the first optical waveguide portion 20A is $R\theta_2$. Further, it is assumed that a refraction angle of the light that is transmitted through the outer circumference of the first optical waveguide portion 20A based on the difference in the refractive indexes of the first and second optical waveguide portions 20A and 20B is $N\theta_2$.

Relationship between the incident angles and the reflection angles is indicated as follows:

$$\theta_0 = R\theta_1 \quad (2)$$
$$\theta_1 = R\theta_2$$
$$\vdots$$
$$\theta_n = R\theta_{n+1}$$

Relationship between the incident angles and the refraction angles is indicated as follows:

$$Na \cdot \sin\theta_0 = Nc \cdot \sin NR\theta_1 \quad (3)$$
$$Nc \cdot \sin\theta_1 = Na \cdot \sin NR\theta_2$$
$$\vdots$$
$$Nc \cdot \sin\theta_n = Na \cdot \sin NR\theta_{n+1}$$

An amount of reflection light R with respect to an amount of incident light P and an amount of refraction light N with respect to the amount of incident light P is obtained as follows:

$$R1 = P * Ref \quad (4)$$
$$N1 = P * (1 - Ref)$$
$$R2 = N1 * (1 - Ref)$$
$$N2 = R1 * Ref$$
$$\vdots$$
$$Rn + 1 = Nn * (1 - Ref)$$
$$Nn + 1 = Rn * Ref$$

Thus, an amount of light that is refracted after it has been reflected in the first optical waveguide portion 20A by reflection times, Ref_cnt and is emitted from the first optical waveguide portion 20A is attenuated based on the transmissivity $T^{Ref\_cnt}$. Accordingly, an angle and a level of the light that is emitted to a circumferential direction of the first optical waveguide portion 20A are obtained. Since the second optical waveguide portion 20B is air layer, the directivity of the light in a circumferential direction of the optical waveguide 2A can be obtained.

[Regular Polygon Column, which is Inscribed in a Circle with Radius r, having a Section of n Pieces of Vertexes]

Figure 6:
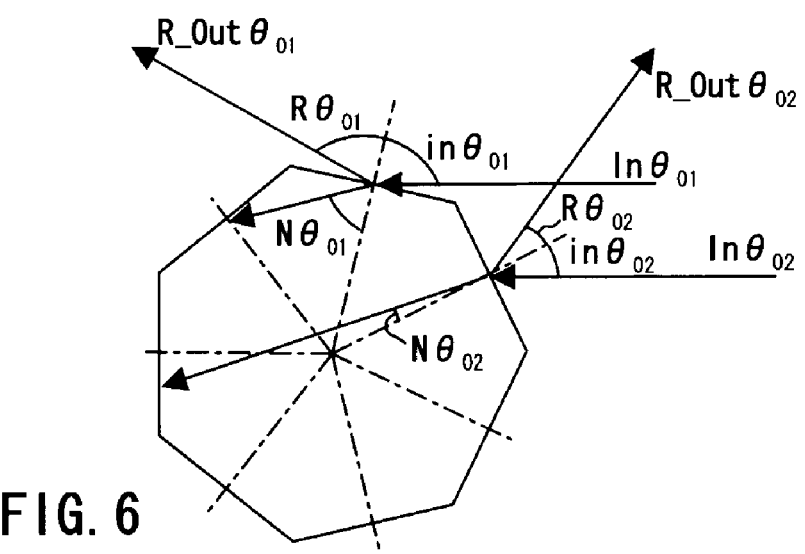
FIG. 6 is a diagram illustrating an example of optical paths of light which is incident to the first optical waveguide portion with a shape like a regular polygon column.

FIG. 6 illustrates an example of optical paths of the light that is incident to the first optical waveguide portion 20A with a shape like a regular polygon column having a section of n pieces of vertexes. If the first optical waveguide portion 20A has a shape like a regular polygon column having a section of n pieces of vertexes, processing that is equivalent to the above-mentioned case where the shape of the first optical waveguide portion 20A is set to a column having a section with a circle of a radius r can be performed, taking into consideration a boundary condition of the vertexes of each side in the regular polygon having n pieces of vertexes in which points of intersection of following equation (5) are linked to each other from zero to n in order.

$$Y = r * \sin(x/2\pi), x = 1/n \quad (5)$$

Figure 7:
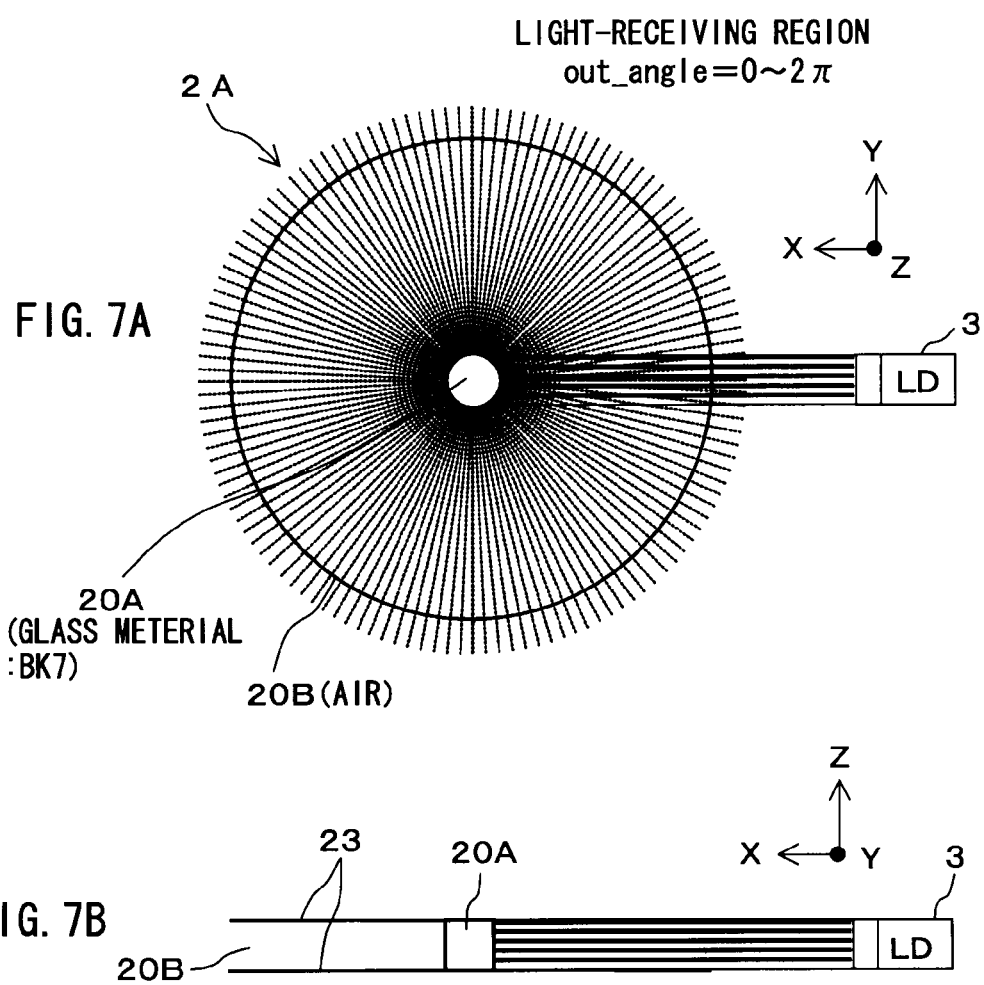
FIGS. 7A and 7B are diagrams showing an outline of the optical waveguide when calculating directivities of the light.

FIGS. 7A and 7B show an outline of the optical waveguide when calculating the directivities of the light. The following will describe the calculation method of the directivities of the light in the optical waveguide 2A more in detail.

The directivities of the light in the optical waveguide 2A are calculated by dividing the light that is incident to the first optical waveguide portion 20A from the laser diode 3 into M by N items of light and addressing them. An optical path relating to the light of each address is calculated and a position, a vector (direction) and a level of the light that is emitted from the outer circumference of the second optical waveguide portion 20B to the outside are obtained at a light-receiving region which is obtained by dividing the circumference of the optical waveguide 2A by n times. Further, a position, a vector (direction) and a level of the light that is not emitted from the first optical waveguide portion 20A to the outside are obtained.

It is to be noted that in this embodiment, the parallel light emitted from the laser diode 3 is incident to the first optical waveguide portion 20A. The optical waveguide material "A" constituting the first optical waveguide portion 20A is glass (BK7) and the optical waveguide material B constituting the second optical waveguide portion 20B is air.

Figure 8:
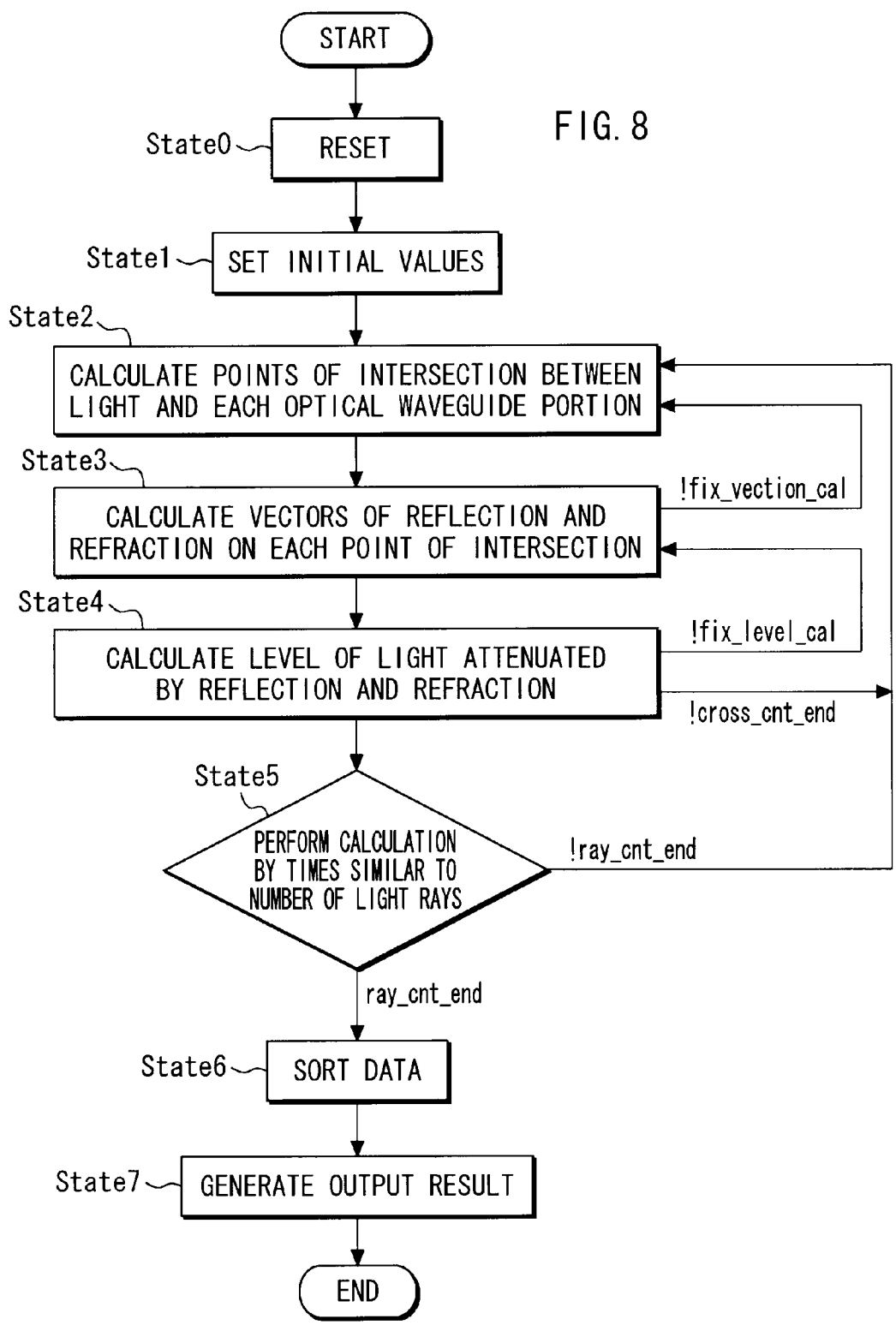
FIG. 8 is a flowchart showing an example of a calculation method of the directivities of the light in the optical waveguide.

FIG. 8 shows an example of the calculation method of the directivities of the light in the optical waveguide. The following will describe a flow of the whole calculation method of the directivities of the light in the optical waveguide 2A.

At State 0, any initial values that have been set are reset;

At State 1, initial values relating to properties of the laser diode 3, properties of the optical waveguide 2A and the like are set;

At State 2, points of intersection between the light that is incident to the optical waveguide 2A and each of the first and second optical waveguide portions 20A and 20B are calculated;

At State 3, vectors of the reflection and the refraction are calculated on each of the points of intersection calculated at the state 2;

At State 4, an amount of the attenuation of the light based on the reflection and the refraction calculated at the state 3 is calculated;

At State 5, the calculations from the state 2 to the state 4 are repeated by times similar to a number of light rays;

At State 6, an array of data obtained by the calculations from the state 2 to the state 5 is sorted; and At State 7, an output result is generated.

Figures 9, 10:
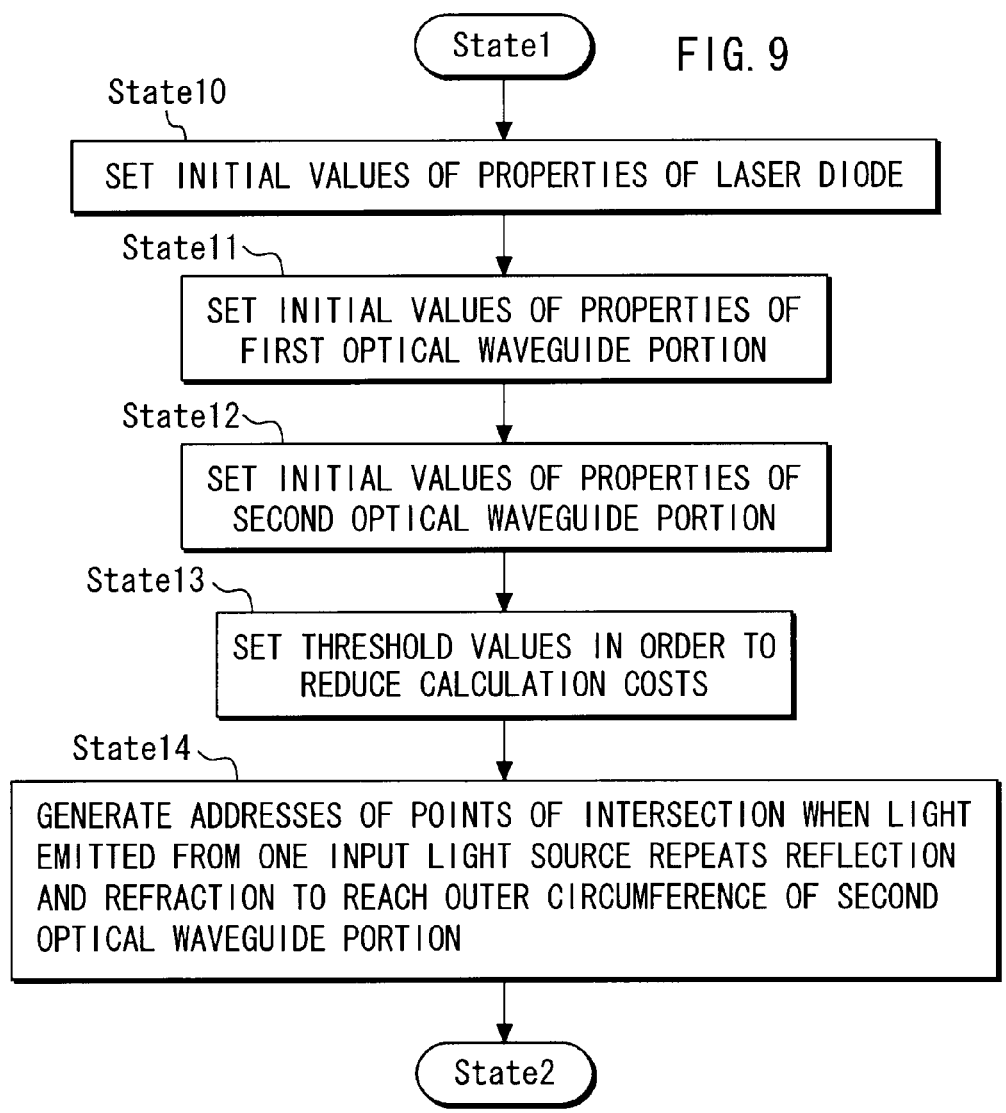
FIG. 9 is a flowchart showing an example of a setting process of initial values.
FIG. 10 is a table showing an example of set initial values relating to various kinds of properties of a laser diode.

FIG. 9 shows an example of a setting process of initial values of the State 1 shown in FIG. 8, which will describe.

At State 10, the initial values of properties of the laser diode 3 are set. FIG. 10 shows an example of set initial values relating to various kinds of properties of the laser diode 3 to be set in the State 10.

At the State 10, for example, as shown in FIG. 10, number of divided input light source, ld_no, laser power, ld_power, a spectrum of light source, sp_type, and a wavelength of the light source, sp_no are set. It is to be noted that numbers set in FIG. 10 are illustrated as examples.

Regarding the numbers of divided input light source, ld_no, the numbers of the divided input light source for allocating addresses to the light emitted from the laser diode 3 are set and the divided numbers of the input light source are determined based on an accuracy of the calculation result. Regarding the laser power, ld_power, power of the laser diode 3 is set.

Regarding the spectrum of light source, sp_type, a spectral line of the light source to be used in the laser diode 3 is set. Regarding the wavelength of the light source, sp_no, the wavelength of the light source to be used in the laser diode 3 is set.

FIG. 11 shows an example of the wavelengths of the light source to be used in the laser diode 3. The table 01 shown in FIG. 11 is a lookup table (LUT) in which species of the light sources, spectral lines, symbols indicating species of the spectral lines, and wavelengths are arrayed. The wavelength of the light source, sp_no, is set based on the spectrum of light source, sp_type, with referring to the table 01 shown in FIG. 11.

At State 11 shown in FIG. 9, properties of the optical waveguide material A constituting the first optical waveguide portion 20A are set. FIG. 12 shows an example of set initial values relating to the properties of the first optical waveguide portion 20A to be set in the State 11.

At the State 11, for example, as shown in FIG. 12, a diameter, mt_a_r, of the first optical waveguide portion 20A, a thickness, mt_a_t, of the first optical waveguide portion 20A, and a coordinate, mt_a_p, of a center of the first optical waveguide portion 20A are set.

A name of the material, mt_a, constituting the first optical waveguide portion 20A, and a refractive index, mt_a_refraction, of the material constituting the first optical waveguide portion 20A are also set.

Further, a name of reflecting material, mt_a_z, constituting the reflecting members provided on the first optical waveguide portion 20A and a reflectivity, mt_a_z_LUT, thereof are set. It is to be noted that numbers set in FIG. 12 are illustrated as examples. Such parameters set in the State 11 may be parameters that set an equation which is capable of expressing an outline of the first optical waveguide portion 20A. Parameters for setting a shape, a position of an origin and a material of the first optical waveguide portion 20A are set so that the parameter alters according to a shape of the first optical waveguide portion 20A.

FIGS. 13A and 13B show examples of relationships between optical waveguide materials and refractive indexes thereof. The table 02 shown in FIG. 13A is a lookup table (LUT) in which the refractive indexes of a predetermined material, for example, BK7 in this embodiment, with respect to respective wavelengths of the light source are indicated. The refractive index, mt_a_refraction, of the material constituting the first optical waveguide portion 20A is set based on the name, mt_a, of the material constituting the first optical waveguide portion 20A with referring to the table 02 shown in FIG. 13A.

FIGS. 14A and 14B show reflectivities of reflecting materials. A graph shown in FIG. 14A shows reflectivities of a predetermined material, for example, a coating member on which aluminum is deposited, in this embodiment, with respect to each wavelength of the light emitted from the light source in cases of a perpendicular incidence, an incidence with 45 degrees toward S surface, and an incidence with 45 degrees toward P surface. The reflectivity, mt_a_z_LUT, of the reflecting material provided on the first optical waveguide portion 20A is set based on the name, mt_a_z, of the material of the reflecting member provided on the first optical waveguide portion 20A with referring to the graph shown in FIG. 14A.

It is to be noted that a graph shown in FIG. 14B shows reflectivities of an enhanced coating member on which aluminum is deposited with respect to each wavelength of the light emitted from the light source in cases of a perpendicular incidence, an incidence with 45 degrees toward S surface, and an incidence with 45 degrees toward P surface. The reflectivity, mt_a_z_LUT, of the reflecting material provided on the first optical waveguide portion 20A is set with referring to the graph shown in FIG. 14B when the name, mt_a_z, of the material of the reflecting member provided on the first optical waveguide portion 20A is AL_023 in this embodiment.

At State 12 shown in FIG. 9, initial values relating to properties of the optical waveguide material B constituting the second optical waveguide portion 20B are set. FIG. 15 shows an example of set initial values relating to the properties of the second optical waveguide portion 20B to be set in the State 12.

At the State 12, for example, as shown in FIG. 15, a diameter, mt_b_r, of the second optical waveguide portion 20B, a thickness, mt_b_t, of the second optical waveguide portion 20B, and a coordinate, mt_b_p, of a center of the second optical waveguide portion 20B are set.

A name of the material, mt_b, constituting the second optical waveguide portion 20B, and a refractive index, mt_b_refraction, of the material constituting the second optical waveguide portion 20B are also set.

Further, a name of material, mt_b_z, constituting the reflecting members provided on the second optical waveguide portion 20B and a reflectivity, mt_b_z_LUT, thereof are set. It is to be noted that numbers set in FIG. 15 are illustrated as examples. Such parameters set in the State 12 may be parameters that set an equation which is capable of expressing an outline of the second optical waveguide portion 20B. Parameters for setting a shape, a position of an origin and a material of the second optical waveguide portion 20B are set so that the parameter alters according to a shape of the second optical waveguide portion 20B.

It is to be noted that the table 03 shown in FIG. 13B is a lookup table (LUT) in which the refractive indexes of a predetermined material, for example, air in this embodiment with respect to each wavelength of the light emitted from the light source are indicated. The refractive index, mt_b_refraction, of the material constituting the second optical waveguide portion 20B is set based on the name of the material, mt_b, constituting the second optical waveguide portion 20B with referring to the table 03 shown in FIG. 13B.

The reflectivity, mt_b_z_LUT, of the reflecting material provided on the second optical waveguide portion 20B is set based on the name, mt_b_z, of the material of the reflecting member provided on the second optical waveguide portion 20B with referring to, for example, the graph shown in FIG. 14A.

At State 13 shown in FIG. 9, threshold values for decreasing an amount of the calculation to reduce calculation costs are set. FIG. 16 shows an example of set values relating to the threshold values that are set at the State 13 for reducing the calculation costs.

At the State 13, for example, as shown in FIG. 16, an upper limit set value, ray_cnt_end, of the number of divided input light source, ld_no, maximum number, cross_cnt_end, of the reflection and the refraction, a resolution, circle_cnt_end, at a light-arrival point on an outermost circumference of the second optical waveguide portion 20B and a setting, Fresnel_on, on whether or not Fresnel calculations for P- and S-waves should be carried out are set.

At State 14 shown in FIG. 9, pieces of arrangement information of light rays emitted from the input light source are generated. FIG. 17 shows an example of the pieces of the arrangement information of the light rays emitted from the input light source generated at the state 14.

At the State 14, by calculating positional information (x1, y1 and z1) of the light rays emitted from the input light source, a unit vector (i, j and k) of the light rays emitted from the input light source, and a level for each light ray emitted from the input light source based on the numbers of divided input light source, ld_no, set at the State 10, the pieces of the arrangement information of the light rays are generated as one shown in FIG. 17. In this embodiment, it is estimated that the unit vector is set to i=−1 in x-direction, and the laser diode 3 emits the light that is incident perpendicular to the optical waveguide 2A.

The level of for each light ray emitted from the input light source is calculated by the following equation (6) based on the numbers of divided input light source, ld_no, set at the State 10 and the laser output, ld_power:

$$\text{Level} = ld\_\text{power}/(ld\_\text{no}+1) \quad (6)$$

where adding one to the numbers of divided input light source, ld_no, in the equation (6) is because an optical path of the light at a center of the input light source can be obtained. It is to be noted that the level and the vector can be set based on a comparative radiation table, not shown.

If the input light source has the spot diameter that is the same as the diameter of the first optical waveguide portion 20A as shown in FIG. 3A, it is unnecessary to generate the arrangement information of the light rays within a range from −1 to −50 of the light rays emitted from the input light source in the arrangement information of the light rays shown in FIG. 17, taking into consideration a symmetry of the light rays emitted from the input light source.

In the other words, if the laser diode 3 emits the light that is incident perpendicular to the X-, Y- or Z-plane so that an output distribution of the laser diode 3 has symmetry, a mirror image portion of the arrangement information of the light rays is not generated.

Figure 18A:
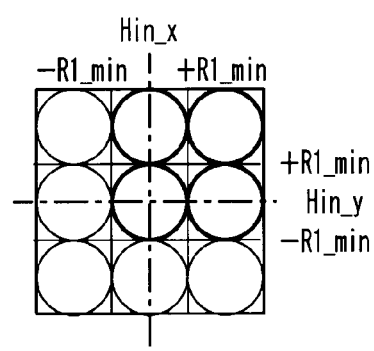
FIGS. 18A and 18B are diagrams showing an example of output distribution of the laser diodes, which has mirror symmetry.
Figure 18B:
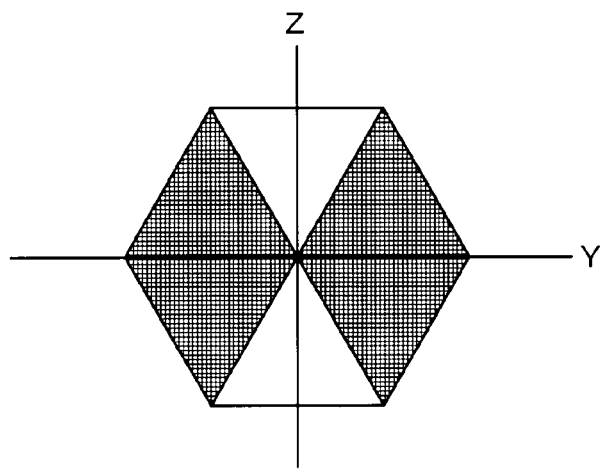
Figure 19A:
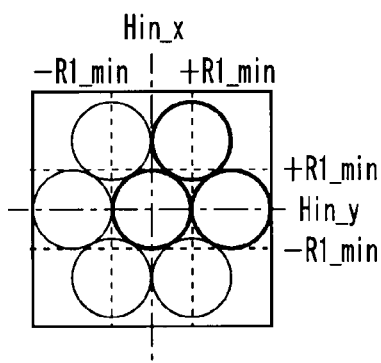
FIGS. 19A and 19B are diagrams showing an example of output distribution of the laser diode, which has rotation symmetry.
Figure 19B:
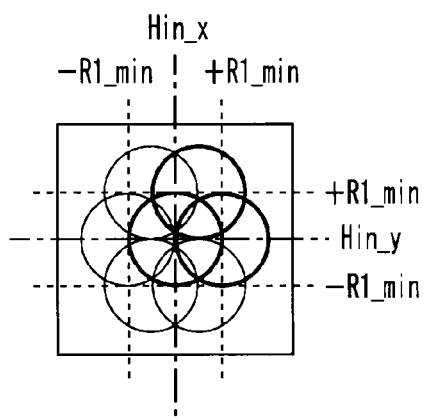

FIGS. 18A and 18B show an example of an output distribution of the laser diodes, which has mirror symmetry and FIGS. 19A and 19B show an example of an output distribution of the laser diodes, which has rotation symmetry. When the output distribution of the laser diodes has the mirror symmetry as shown in FIGS. 18A and 18B and the laser diodes are provided on one plane that is symmetrical to X- and Y-planes or Y- and Z-planes, steps of calculations are decreased to 50% thereof. Further, the light is spread or concentrated, shaded portions and solid-white portions are respectively equal to each other as shown in FIG. 18B so that when the laser diodes are provided on both planes that are symmetrical to X- and Y-planes or Y- and Z-planes, steps of calculations are decreased to 25% thereof.

On the other hand, when the output distribution of the laser diodes has the rotation symmetry as shown in FIGS. 19A and 19B and the laser diodes are provided on one axis that is symmetrical to X-axis, steps of the calculations can be decreased utilizing the symmetry. Further, when the output distribution of the laser diodes has the rotation symmetry as shown in FIG. 19B, the output of the laser diode becomes denser following a center thereof and becomes thinner following an outer thereof so that the output distribution of the laser diodes has asymmetry. If so, the steps of the calculations remain 100%.

At State 15 shown in FIG. 9, the numbers (addresses) of divided optical paths are generated when the light emitted from one input light source repeats the reflection and the refraction to reach the outer circumference of the second optical waveguide portion 20B. FIGS. 20A and 20B show an example of the generation of the addresses to be assigned to the reflected light and the refracted light.

As shown in FIG. 5, a part of the light that is incident to the first optical waveguide portion 20A from the outside is reflected by the beam splitter 22 provided on the outer circumference of the first optical waveguide portion 20A so that it reaches the outer circumference of the second optical waveguide portion 20B. Another part of the light that is incident to the first optical waveguide portion 20A from the outside is refracted by the beam splitter 22 so that it is incident to the first optical waveguide portion 20A.

The part of the light that is incident to the first optical waveguide portion 20A is refracted by the outer circumference of the first optical waveguide portion 20A to output it therefrom so that it reaches the outer circumference of the second optical waveguide portion 20B. Another part of the light that is incident to the first optical waveguide portion 20A is reflected by the outer circumference of the first optical waveguide portion 20A so that it returns to the first optical waveguide portion 20A.

The following is done according to the same way as the above so that based on a repetition of the reflection and the refraction, there are the light that is not output from the first optical waveguide portion 20A, which is enclosed by the dotted lines in FIG. 20A and the light that is output from the second optical waveguide portion 20B.

Thus, with respect to the light having an address, which is incident to the first optical waveguide portion 20A from the outside, items of the light caused by the reflection and the refraction are respectively addressed so that the data, Cross- _data, having cross count addresses, cross_cnt_ad, composed of, for example, information of seven bits can be generated as shown in FIG. 20B.

In the Cross_data shown in FIG. 20B, a first bit of the address, cross_cnt_ad, indicates which the light is incident to the first optical waveguide portion 20A from the second optical waveguide portion 20B or the light is incident to the second optical waveguide portion 20B from the first optical waveguide portion 20A. A zero bit of the address, cross_cnt_ad, indicates either of the reflection or the refraction.

Into the Cross_data shown in FIG. 20B, the data, B<A_on, indicating whether or not the light is incident to the first optical waveguide portion 20A from the second optical waveguide portion 20B is added. Since this value is the same information as that of the first bit of the address, cross_cnt_ad, (B→A_on=cross_cnt_ad[1]), it may be omitted.

Figure 21:
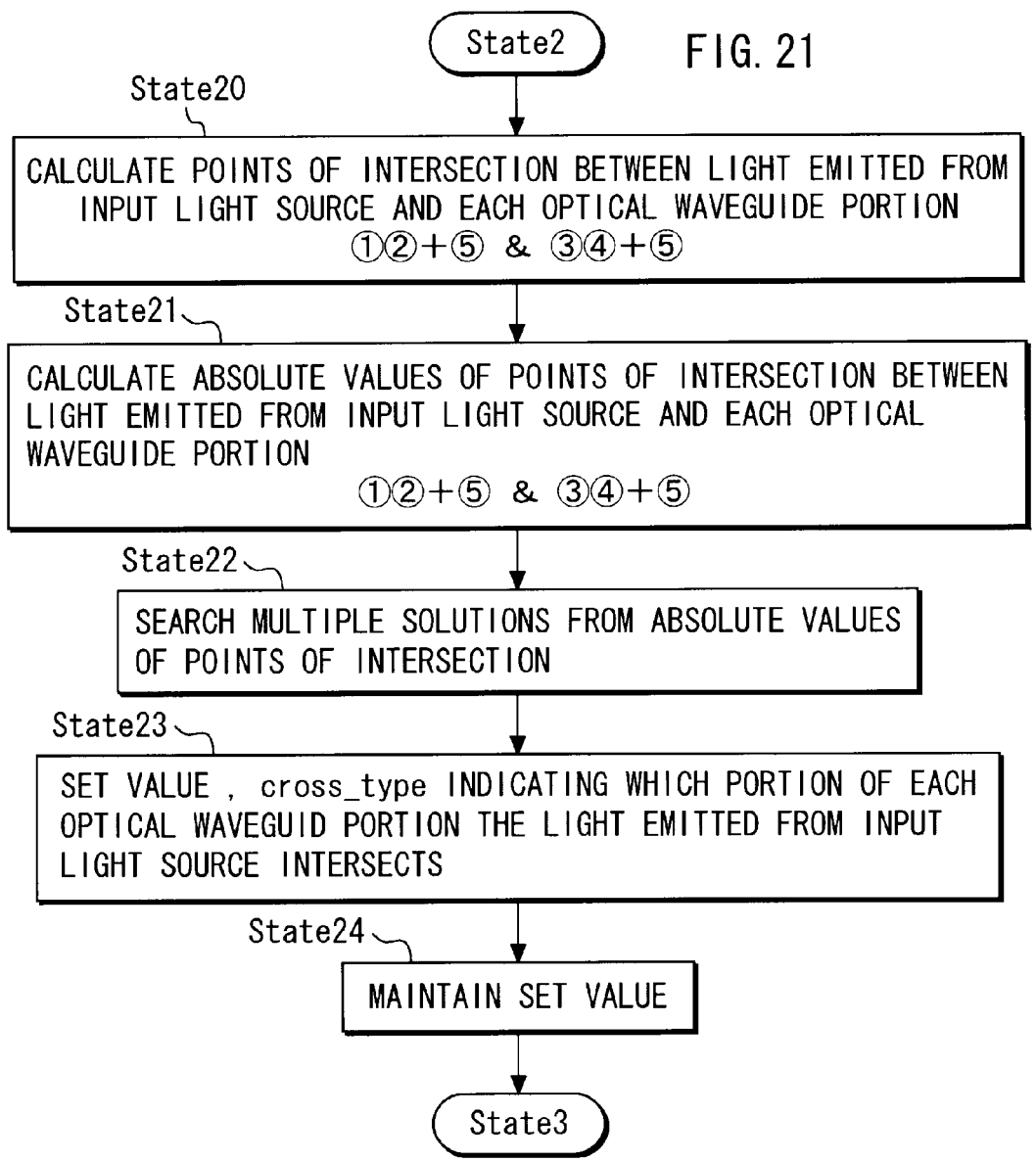
FIG. 21 is a flowchart showing an example of calculation process of points of intersection between the light that is incident to the optical waveguide and each of the first and second optical waveguide portions.

FIG. 21 shows an example of calculation process of points of intersection between the light that is incident to the optical waveguide and each of the first and second optical waveguide portions. The following will describe the processing of the State 2 shown in FIG. 8.

At State 20, points of intersection between the light that is emitted from the input light source and each of the first and second optical waveguide portions 20A and 20B are calculated. A shape of the first optical waveguide portion 20A is obtained by the following equation (7) using the diameter, mt_a_r, and the thickness, mt_a_t, of the first optical waveguide portion 20A set at the State 11. A shape of the second optical waveguide portion 20B is obtained by the following equation (8) using the diameter, mt_b_r, and the thickness, mt_b_t, of the second optical waveguide portion 20B set at the State 12. The selected input light source is obtained by the following equation (9) using the arrangement information of the light rays shown in FIG. 17 corresponding to the address of Cross_data shown in FIG. 20B.

$$x^2+y^2=(mt\_a\_r/2)^2 \;①$$
$$z=\pm mt\_a\_t^2 \;② \tag{7}$$

$$x^2+y^2=(mt\_b\_r/2)^2 \;③$$
$$z=\pm mt\_b\_t^2 \;④ \tag{8}$$

$$(x-x1)/i=(y-y1)/j=(z-z1)/k \;⑤ \tag{9}$$

Accordingly, a point of intersection between the light that is emitted from the input light source and the first optical waveguide portion 20A is calculated based on the equations (7) and (9) and a point of intersection between the light that is emitted from the input light source and the second optical waveguide portion 20B is calculated based on the equations (8) and (9).

At State 21 shown in FIG. 21, according to the calculation procedure similar to that of the State 20, absolute values of the points of intersection between the light that is emitted from the input light source and each of the first and second optical waveguide portions 20A and 20B are calculated so that a positional relationship between the points of intersection can be obtained.

Figure 22:
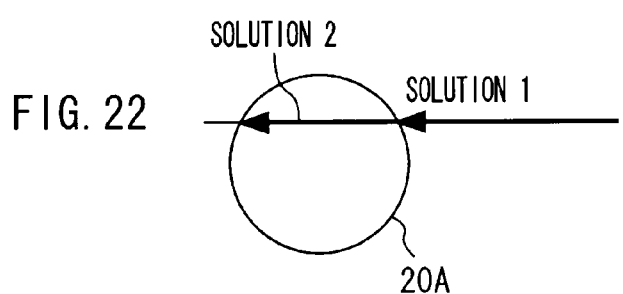
FIG. 22 is a diagram showing a case in which multiple solutions stay.

At State 22 shown in FIG. 21, any multiple solutions are searched from the absolute value of each of the points of intersection obtained at the State 21. FIG. 22 shows a case in which the multiple roots stay. If the points of intersection between the light that is emitted from the input light source and the first optical waveguide portion 20A are obtained due to the equations (7) and (9), solution 1 and solution 2 shown in FIG. 22 stay in this case.

At the State 22, items of data of the absolute values of the points of intersection including the multiple solutions are rearranged so that the solution 1, namely, the point of intersection between the light that is incident to the first optical waveguide portion 20A from the outside and the first optical waveguide portion 20A is obtained.

At State 23 shown in FIG. 21, it is obtained from the absolute values of the points of intersection excluding the multiple solutions obtained at the State 22 where the light emitted from the input light source intersects the first and second optical waveguide portions 20A and 20B.

At the State 23, if the absolute values of the points of intersection satisfy requirements of the following equation (10), it is determined that the light emitted from the input light source intersects a side surface of the first optical waveguide portion 20A and, at State 24, a value, cross_type=1, is set and maintained.

If the absolute values of the points of intersection satisfy requirements of the following equation (11), it is determined that the light emitted from the input light source intersects a bottom surface of the first optical waveguide portion 20A and, at the State 24, a value, cross_type=2, is set and maintained.

If the absolute values of the points of intersection satisfy requirements of the following equation (12), it is determined that the light emitted from the input light source intersects a side surface of the second optical waveguide portion 20B and, at the State 24, a value, cross_type=3, is set and maintained.

If the absolute values of the points of intersection satisfy requirements of the following equation (13), it is determined that the light emitted from the input light source intersects a bottom surface of the second optical waveguide portion 20B and, at the State 24, a value, cross_type=4, is set and maintained.

$$①|xyz|<②③④|xyz| \tag{10}$$

$$②|xyz|<①③④|xyz| \tag{11}$$

$$③|xyz|<①②④|xyz| \tag{12}$$

$$④|xyz|<①②③|xyz| \tag{13}$$

Figures 23, 24:
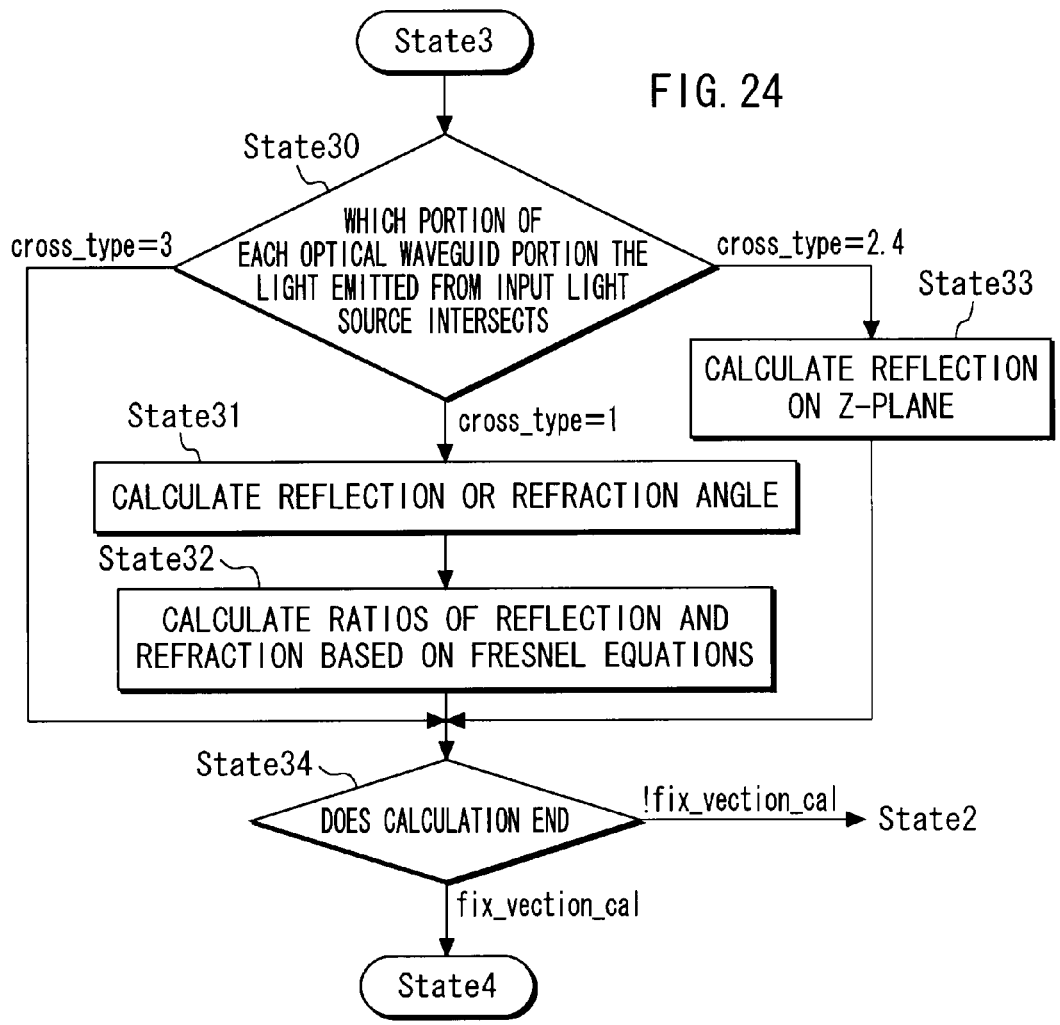
FIG. 23 is a table showing a result of the calculation of points of intersection between the light that is incident to the optical waveguide and each of the first and second optical waveguide portions.
FIG. 24 is a flowchart showing a process of calculating vectors of the reflection and the refraction at the points of intersection.

FIG. 23 shows a result of the calculation of the points of intersection between the light that is incident to the optical waveguide and each of the first and second optical waveguide portions. In the above-mentioned process at the State 20 through the State 24, the values of Cross_data, which are boxed with alternate long and short dashed lines in FIG. 23, are input and the values of Cross_data, which are boxed with a solid line in FIG. 23, are output.

FIG. 24 shows a process of calculating vectors of the reflection and the refraction at the points of intersection obtained at the State 2. The following will describe the processing at the State 3 shown in FIG. 8.

At State 30, it refers to which position of each of the first or second optical waveguide portion 20A, 20B the light emitted from the input light source intersects. In a case of the set value, cross_type=1, in which the light emitted from the input light source intersects the side surface of the first optical waveguide portion 20A, the process of State 31 is performed. In a case of the set value, cross_type=2 or 4, in which the light emitted from the input light source intersects the bottom surface of the first optical waveguide portion 20A or the bottom surface of the second optical waveguide portion 20B, the process of State 33 is performed. In a case of the set value, cross_type=3, in which the light emitted from the input light source intersects the side surface of the second optical waveguide portion 20B, the process of State 34 is performed.

At the State 31 shown in FIG. 24 which is performed in the case where the light emitted from the input light source intersects the side surface of the first optical waveguide portion 20A, reflection or refraction angle is calculated according to the following equation (14).

$$\frac{\sin\theta_A}{\sin\theta_B} = \frac{\lambda_A}{\lambda_B} = \frac{v_A}{v_B} = \frac{n_B}{n_A} = n_{AB} \quad (14)$$

where $\theta_A$ indicates an incident angle from first medium A to second medium B, $\theta_B$ indicates a refracting angle from first medium A to second medium B, $\lambda_A$ indicates a wavelength of wave in first medium A, $\lambda_B$ indicates a wavelength of wave in second medium B, $v_A$ indicates a velocity of wave in first medium A, $V_B$ indicates a velocity of wave in second medium B, $n_A$ indicates an absolute refractive index of first medium A, $n_B$ indicates an absolute refractive index of second medium B and $n_{AB}$ indicates a relative refractive index of second medium B to first medium A.

Figures 25, 26, 27:
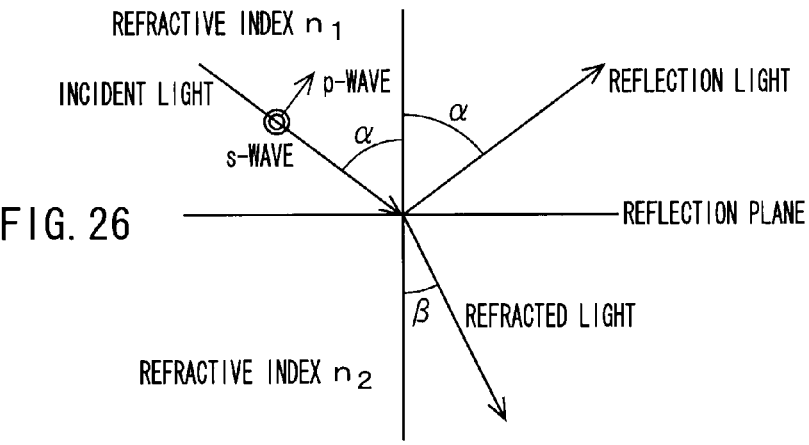
FIG. 25 is a table showing a result of the calculation of the reflection and refraction angles.
FIG. 26 is a graph showing a relationship between incident light and reflection light or refraction light.
FIG. 27 is a table showing an example of a result of the calculation of the ratios of the reflection and the refraction.

FIG. 25 shows a result of the calculation of the reflection and refraction angles. In the processing at the State 31, the values of Cross_data, which are boxed with alternate long and short dashed lines in FIG. 25, are input and the values of Cross_data, which are boxed with a solid line in FIG. 25, are output.

At the State 32 shown in FIG. 24, ratios of the reflection and the refraction are calculated based on Fresnel equations on X- and Y-planes or Y- and Z-planes. Here, the following calculation is performed in a case of Fresnel_on=1 at the State 13 shown in FIG. 16.

FIG. 26 shows a relationship between incident light and reflection light or refraction light. An amplitude reflectivity rp of S-wave (TE-wave, H-wave, horizontal polarization or orthogonal polarization) is given by the following equation (15) and an amplitude transmissivity tp thereof is given by the following equation (16). An amplitude reflectivity of P-wave (TM-wave, E-wave, vertical polarization or parallel polarization) is given by the following equation (17) and an amplitude transmissivity ts thereof is given by the following equation (18).

$$r_p = \frac{n_1\cos\beta - n_2\cos\alpha}{n_1\cos\beta + n_2\cos\alpha} = -\frac{\tan(\alpha-\beta)}{\tan(\alpha+\beta)} \quad (15)$$

$$t_p = \sqrt{\frac{n_2\cos\beta}{n_1\cos\alpha}} \frac{2n_1\cos\alpha}{n_2\cos\alpha + n_1\cos\beta} \quad (16)$$

$$= \sqrt{\frac{n_2\cos\beta}{n_1\cos\alpha}} \frac{2\cos\alpha\sin\beta}{\sin(\alpha+\beta)\cos(\alpha-\beta)}$$

$$r_s = \frac{n_1\cos\alpha - n_2\cos\beta}{n_1\cos\alpha + n_2\cos\beta} = \frac{\sin(\alpha-\beta)}{\sin(\alpha+\beta)} \quad (17)$$

$$t_s = \sqrt{\frac{n_2\cos\beta}{n_1\cos\alpha}} \frac{2n_1\cos\alpha}{n_1\cos\alpha + n_2\cos\beta} \quad (18)$$

$$= \sqrt{\frac{n_2\cos\beta}{n_1\cos\alpha}} \frac{2\cos\alpha\sin\beta}{\sin(\alpha+\beta)}$$

where $\alpha$ is an incidence angle, $\beta$ is a refraction angle, $n_1$ is absolute refractive index of material before the incidence plane and $n_2$ is absolute refractive index of material after the incidence plane.

An absolute value Rp of the amplitude reflectivity rp of the s-wave is given by the following equation (19) and an absolute value Tp of the amplitude transmissivity tp of the S-wave is given by the following equation (20). An absolute value Rs of the amplitude reflectivity rs of the p-wave is given by the following equation (21) and an absolute value Ts of the amplitude transmissivity ts of the p-wave is given by the following equation (22).

$$Rp = |Rp|^2 \quad (19)$$

$$Tp = \frac{n_2\cos\theta_2}{n_1\cos\theta_1}|tp|^2 \quad (20)$$

$$Rs = |rs|^2 \quad (21)$$

$$Ts = \frac{n_2\cos\theta_2}{n_1\cos\theta_1}|ts|^2 \quad (22)$$

It is to be noted that since the equations, Rp+Tp=1 and Rs+Ts=1 are held, only one term may be obtained.

FIG. 27 shows an example of a result of the calculation of the ratios of the reflection and the refraction. In the above-mentioned processing at the State 32, the values of Cross_data, which are boxed with alternate long and short dashed lines in FIG. 27, are input and the values of Cross_data, which are boxed with a solid line in FIG. 27, are output.

It is to be noted that in a case of Fresnel_on=0 at the State 13 shown in FIG. 16, Schlich's approximation like the following equation (23) is performed. This equation, however, is not highly precise so that the calculation based on the above-mentioned Fresnel equation is preferable.

$$F_r(\theta) \approx F_0 + (1-F_0)^5 \quad (23)$$

where $F_0$ is real part of the Fresnel reflection coefficient at a time of the vertical incidence.

At the State 33 in which the light emitted from the input light source intersects the bottom surface of the first optical waveguide portion 20A or the bottom surface of the second optical waveguide portion 20B, a calculation of the reflection on the Z-plane is performed.

At the State 33, Snell's equation (14) described at the State 31 is used as a calculation equation. Unit vector (i, j, and k) of the light emitted from the input light source is input and the calculation is performed by referring to the wavelength, sp_no, of the light emitted from the input light source set at the State 10 and, if the light emitted from the input light source intersects the bottom surface of the first optical waveguide portion 20A, the reflectivity, mt_a_z_LUT, of the reflecting member provided on the first optical waveguide portion 20A, which is set at the State 11. The calculation is performed by referring to the reflectivity, mt_b_z_LUT, of the reflecting member provided on the second optical waveguide portion 20B, which is set at the State 12 if the light emitted from the input light source intersects the bottom surface of the second optical waveguide portion 20B, so that a reflection vector is obtained and numbers of the reflection (hereinafter, referred to as "level reflectance loss numbers") at the reflecting members 23 are counted.

FIGS. 28A and 28B show an example of a result of the calculation of the reflection on Z-plane. In the processing at the above-mentioned State 33, the values of Cross_data, which are boxed with alternate long and short dashed lines in FIG. 28A, are input so as to generate the data (Z_Cross_data) shown in FIG. 28B in which the values, which are boxed with a solid line in FIG. 28B, are output.

The data, Z_Cross_data, maintains the address, the reflection vector and the level reflectance loss numbers. When the address alters, a row is added and when no address alters, the data is overwritten. In the data, Z_Cross_data, values of the level reflectance loss numbers, not the level of the light are maintained. This is because the level lost by the reflection is obtained by multiplying the level reflectance loss numbers by the loss if the level reflectance loss numbers can be obtained.

At State 34, a signal, fix_vection_cal, determining the processing is generated according to a situation whether or not the calculation has finished.

In a case of the set value, cross_type=2 or 4, in which the light emitted from the input light source intersects the bottom surface of the first optical waveguide portion 20A or the bottom surface of the second optical waveguide portion 20B, the signal, fix_vection_cal, is generated because the calculation has not yet finished and the process goes back to the State 2. In a case of the set value, cross_type=1, in which the light emitted from the input light source intersects the side surface of the first optical waveguide portion 20A or in a case of the set value, cross_type=3, in which the light emitted from the input light source intersects the side surface of the second optical waveguide portion 20B, the processing of State 4 is performed because the calculation has finished.

Figures 29, 30:
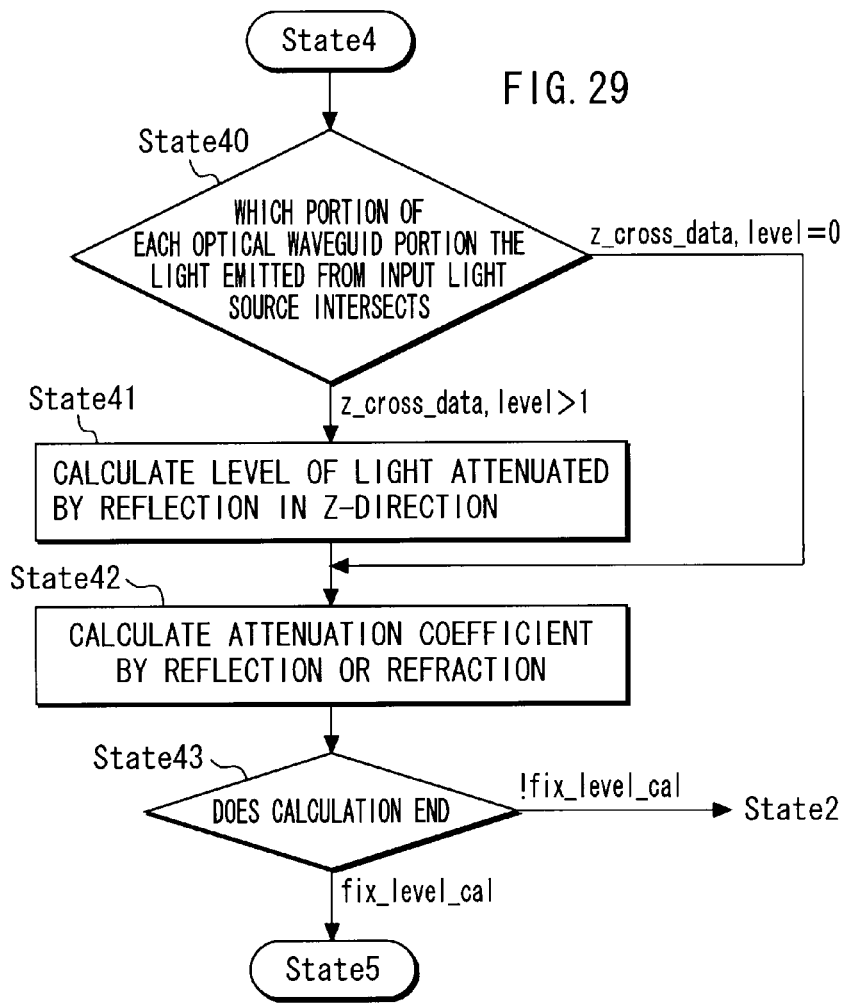
FIG. 29 is a flowchart showing an example of a calculation process concerning how far the light is attenuated by the reflection and the refraction.
FIG. 30 is a table showing an example of a result of the calculation of the level by the reflection and the refraction on X- and Y-planes.

FIG. 29 shows an example of a calculation process concerning how far the light is attenuated by the reflection and the refraction which are obtained at the State 3. The following will describe the processing of the State 4 shown in FIG. 8.

At State 40, it is referred which position of the first or second optical waveguide portion 20A, 20B the light emitted from the input light source intersects.

In a case of the set value, cross_type=2 or 4, in which the data, z_cross_data, level>0 because the light emitted from the input light source intersects the bottom surface of the first optical waveguide portion 20A or the bottom surface of the second optical waveguide portion 20B so that the level reflectance loss numbers can be maintained in the data, Z_Cross_data, shown in FIG. 28B at the State 3, processing at State 41 is performed.

In a case of the set value, cross_type=1 or 3, in which the data, z_cross_data, level=0 because the light emitted from the input light source intersects the side surface of the first optical waveguide portion 20A or the side surface of the second optical waveguide portion 20B, processing at State 42 is performed.

At the State 41 shown in FIG. 29, a level of the light, z_level, which is attenuated by the reflection in the Z-direction is given by the following equation (24).

$$z\_level = cross\_data, level * mt\_z\_LUT^{z\_cross\_data, level} \qquad (24)$$

The level of the light, z_level, of the equation (24) is given by multiplying the level of the light from emitted from the input light source, which is selected by the data, Cross_data shown in FIG. 28A, by the value obtained by exponentiating the reflectivity, mt_z_LUT, with the level reflectance loss numbers, z_cross_data, level of the data, Z_Cross_data, shown in FIG. 28B and is given by multiplying an amount of the attenuation based on the reflection numbers.

Since the reflection in the Z-direction occurs at any of the reflecting members, the calculation regarding the reflectivity, mt_z_LUT, is performed by referring to the reflectivity, mt_a_z_LUT, of the reflecting members of the first optical waveguide portion 20A set at the State 11 in a case of the set value, cross_type=2 in which the light emitted from the input light source intersects the bottom surface of the first optical waveguide portion 20A. In the cases excluding the above-mentioned case in this embodiment, particularly, in a case of the set value, cross_type=4 in which the light emitted from the input light source intersects the bottom surface of the second optical waveguide portion 20B, the calculation is performed by referring to the reflectivity, mt_b_z_LUT, of the reflecting members of the second optical waveguide portion 20B set at the State 12.

At State 42 shown in FIG. 29, an attenuation coefficient, mt_reflection, by the reflections on X- and Y-planes is given by the following equation (25) using the reflectivities (absolute values), Rp and Rs, of s-wave and p-wave calculated at the State 32. The level of the light, reflect_level, attenuated by the reflections on X- and Y-planes is given by the following equation (26). An attenuation coefficient, mt_refraction, by the refractions on X- and Y-planes is given by the following equation (27) using the transmissivities (absolute values), Tp and Ts, of s-wave and p-wave calculated at the State 32. The level of the light, refract_level, attenuated by the refractions on X- and Y-planes is given by the following equation (28).

$$mt\_reflection = (Rp+Rs)/2 \qquad (25)$$

$$reflect\_level = cross\_data, level * mt\_reflection \qquad (26)$$

$$mt\_refraction = (Tp+Ts)/2 \qquad (27)$$

$$refract\_level = cross\_data, level * mt\_refraction \qquad (28)$$

The level of the light, reflect_level, of the equation (26) is given by multiplying the level of the light, cross_data, level, from emitted from the input light source, which is selected by the data, Cross_data, by the attenuation coefficient, mt_reflection. The level of the light, refract_level, of the equation (28) is given by multiplying the level of the light, cross_data, level, from emitted from the input light source, which is selected by the data, Cross_data, by the attenuation coefficient, mt_refraction.

FIG. 30 shows an example of a result of the calculation of the level by the reflection and the refraction on X- and Y-planes. At the above-mentioned State 42, the values of Cross_data, which are boxed with alternate long and short dashed lines in FIG. 30, are input and the values of Cross_data, which are boxed with a solid line in FIG. 30, are output.

At State 43 shown in FIG. 29, a signal, fix_level_cal, determining the processing is generated according to a situation whether or not the calculation has finished.

In a case of the set value, cross_type=3, in which the light emitted from the input light source intersects the side surface of the second optical waveguide portion 20B and the light outputs from the second optical waveguide portion 20B, processing at the State 5 is performed because the calculation has finished. In cases other than that, in this embodiment, in cases of the set value, cross_type=1, in which the light emitted from the input light source intersects the side surface of the first optical waveguide portion 20A and the set value, cross_type=2 and 4, in which the light emitted from the input light source intersects the bottom surface of the first optical waveguide portion 20A and the bottom surface of the second optical waveguide portion 20B, the signal, fix_level_cal, is generated because the calculation has not yet finished and the process goes back to the State 3.

At the State 5, the calculations from the State 2 to the State 4 are repeated by times similar to numbers of divided light rays emitted from the input light source set at the State 10.

At the State 6, the items of data, Cross_data and Z_Cross_data, which are obtained from the State 2 to the State 5, are sorted.

At the State 6, the array of the data, Cross_data, returns on the basis of symmetry of the distribution of the output of the laser diode. The data, Cross_data, is sorted on the basis of the coordinates, Cross_address, of each point of the intersection so that it returns to the address on the outer circumference of the second optical waveguide portion 20B. This is because it is searched how many light rays are reached to the address on the outer circumference of the second optical waveguide portion 20B and how far the level thereof is. Further, the data, Z_Cross_data, is sorted on the basis of the coordinates, Z_Cross_address, of each point of the intersection on Z-direction and the light that is output from the second optical waveguide portion 20B and the light that is not output from the second optical waveguide portion 20B are distinguished.

At the State 7, a result of output obtained by the calculations from the State 2 to the State 6 is generated.

By extracting address, cross_cnt_ad, of the data, Cross_data, calculated by the calculations from the State 2 to the State 6 at the address, cross_cnt_ad[1]=0 and the address, cross_cnt_ad[0]=1, the data, Cross_cnt_data,x1,y1,z1 indicates a position (x, y, z) of the light output from the second optical waveguide portion 20B between zero and $2\pi$ of the circumference direction of the second optical waveguide portion 20B as a distribution level of the output of the light output from the second optical waveguide portion 20B. The data, Cross_cnt_data,i,j,k indicates vector (i,j,k) of the light output from the second optical waveguide portion 20B. The data, Cross_cnt_data, level indicates a level of the light output from the second optical waveguide portion 20B.

By extracting address, cross_cnt_ad, of the data, Cross_data, calculated by the calculations from the State 2 to the State 6 at the maximum address, cross_cnt_ad and the address, cross_cnt_ad[0]=0, the data, Cross_cnt_data,x1,y1,z1 indicates a position (x, y, z) of the light that is not output from the first optical waveguide portion 20A as a distribution level of loss of the light that is not output from the first optical waveguide portion 20A. The data, Cross_cnt_data,i,j,k indicates vector (i,j,k) of the light that is not output from the first optical waveguide portion 20A. The data, Cross_cnt_data, level indicates a level of the light that is not output from the first optical waveguide portion 20A.

Thus, it is capable of calculate how many light rays reach each address between zero and $2\pi$ of the circumference direction of the second optical waveguide portion 20B, the level of each ray thereof, and the vector thereof so that the directivity of the light on the circumference direction of the optical waveguide 2A can be obtained.

It is to be noted that at the State 41 shown in FIG. 29, the level of the light, z_level, attenuated by the reflection on the Z-direction is calculated using the level reflectance loss numbers. On the other hand, by substituting the following equation (29) for the above-mentioned equation (24), the level of the light lost by the reflection can be obtained as z_cross_data, level. Here, the processing at the State 41 may be performed by selecting either the calculation of the above-mentioned equation (24) or the calculation of the equation (29).

$$z\_level = cross\_data, level * (1 - mt\_z\_LUT)\hat{}z\_cross\_data, level$$

$$x\_cross\_data, level = z\_level \quad (29)$$

[Variation of the Optical Selector Switch of this Embodiment]

In the above-mentioned optical selector switch 1A, the reflection of the light by the beam splitter 22 provided on a boundary of the first and second optical waveguide portions 20A and 20B, which has different optical transmissivity, and the refraction of the light based on the difference between the optical transmissivities of the first and second optical waveguide portions 20A and 20B causes the light in the optical waveguide to have directivities.

On the other hand, if the first optical waveguide portion 20A has a column, it is possible that the light in the optical waveguide has directivities utilizing diffraction by launching the light to the boundary of the first and second optical waveguide portions 20A and 20B. If the first optical waveguide portion 20A has a regular polygon column, it is possible that the light in the optical waveguide has directivities utilizing diffraction by launching the light to an angle of the section of the regular polygon column.

It is to be noted that an amount of the light that reaches optical paths branched by the reflection and the refraction can be statically changed in a circumference direction of the optical waveguide 2A by statically changing reflectivity of the beam splitter 22 provided on the outer circumference of the first optical waveguide portion 20A along the circumference direction thereof.

Further, an amount of the light that reaches the optical paths branched by the reflection and the refraction can be statically changed in a circumference direction of the optical waveguide 2A by providing the optical waveguide 2A with, as the light-dividing device, thermochromic material which reversibly changes its optical properties such as transmission, reflection, absorption and the like based on the temperature and adjusting the temperature, in addition to the beam splitter.

Additionally, an amount of the light that reaches the optical paths branched by the reflection and the refraction can be statically changed in a circumference direction of the optical waveguide 2A by providing the optical waveguide 2A with, as the light-dividing device, electrochromic mirror material or photochromic mirror material (alloy film of magnesium and nickel) which reversibly changes its optical properties such as transmission, reflection, absorption and the like based on electricity or gas and adjusting the electricity or composition condition or temperature of the gas, in addition to the beam splitter.

If the first optical waveguide portion 20A has a regular polygon column, an amount of the light that reaches the optical paths branched by the reflection and the refraction can be statically changed in a circumference direction of the optical waveguide 2A by changing its optical property for each surface.

[Configuration of Embodiment of Signal-Processing Apparatus]

Figure 31A:
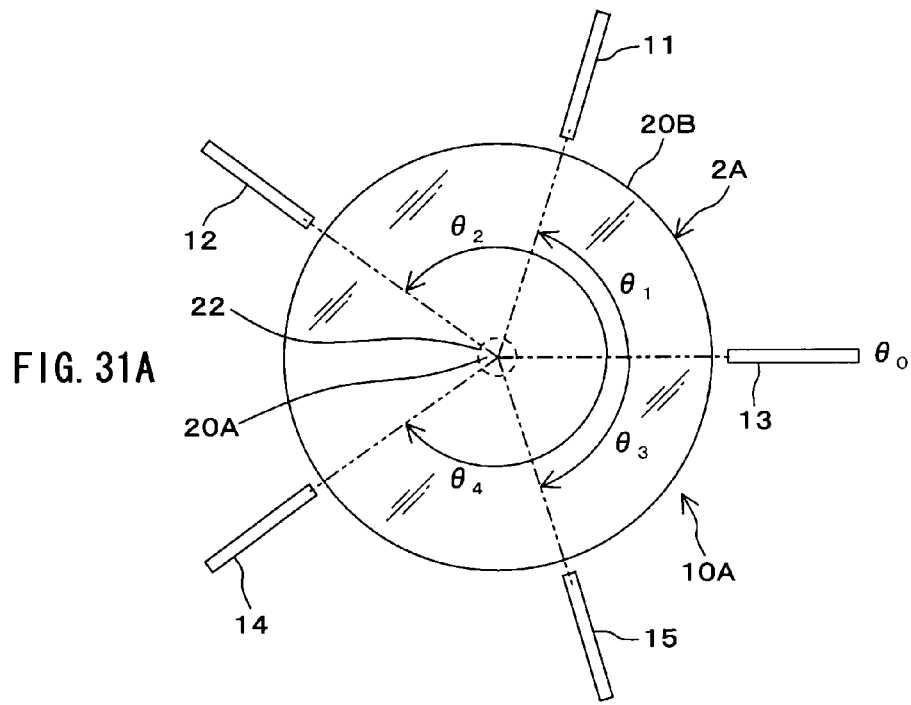
FIGS. 31A and 31B are schematic diagrams showing an embodiment of a signal-processing apparatus according to the invention.
Figure 31B:
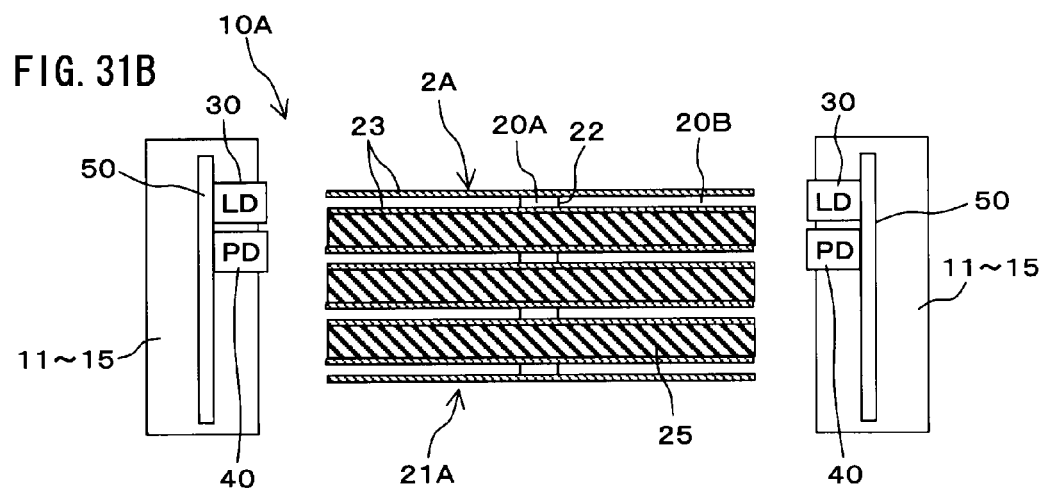

FIGS. 31A and 31B show an embodiment of a signal-processing apparatus according to the invention. FIG. 31A is a schematic plane view of the embodiment of the signal-processing apparatus. FIG. 31B is a schematic side view of the embodiment of the signal-processing apparatus.

This embodiment of the signal-processing apparatus 10A includes an image input board 11, an image output board 12, a remote-control-signal-receiving board 13, a zoom board 14, and a digital reality creation (DRC) volume board 15 as functional boards each having a predetermined function. The signal-processing apparatus 10A also includes an optical waveguide structure 21A. The image input board 11, the image output board 12, the remote-control-signal-receiving board 13, the zoomboard 14, and the digital reality creation (DRC) volume board 15 are connected to each other via optional signal path of the optical waveguide structure 21A.

The optical waveguide structure 21A includes a plurality of the optical waveguides 2A, which has been described regarding FIGS. 1A through 4E. The optical waveguides 2A are stacked with a spacer that is a light-shielding member composed of light-shield material being held between the optical waveguides 2A.

In the optical waveguide 2A of each layer, as described above, the light that is incident thereto from a predetermined position of the outer circumference thereof is emitted radially toward the circumference of the optical waveguide 2A with having predetermined directivities by the reflection of the beam splitter 22, the refraction based on the difference in the optical transmissivities of the first and second optical waveguide portions 20A and 20B and the like.

This prevents the light from being leaked from a stacked direction of the optical waveguides 2A so that the respective optical waveguides 2A can transmit the signal independently.

The image input board 11, the image output board 12, the remote-control-signal-receiving board 13, the zoom board 14 and the DRC volume board 15 respectively have a light-emitting unit 30 that outputs an optical signal and a light-receiving unit 40 that receives an optical signal.

The light-emitting unit 30 of each board is provided with, for example, a laser diode that has an oscillation wavelength similar to each other. The light-receiving unit 40 is provided with, for example, a photodetector that has light-receiving sensitivity corresponding to the wavelength of the light emitted from the laser diode.

The light-emitting unit 30 and the light-receiving unit 40 are respectively provided with a driving mechanism 50 that drives the light-emitting unit 30 or the light-receiving unit 40 to move along a stacked direction of the optical waveguides 2A so that the light-emitting unit 30 and the light-receiving unit 40 are arranged so as to meet the light-emitting unit to a desired optical waveguide 2A of the stacked optical waveguides 2A to emit the light to the desired optical waveguide 2A and so as to meet the light-receiving unit to a desired optical waveguide 2A of the stacked optical waveguides 2A to receive the light from the desired optical waveguide 2A. This allows the signal paths to be changed among the functional boards.

The driving mechanism 50 includes rails that are mounted on, for example, each functional board, a roller that rotates on each of the rails and is attached to the light-emitting unit 30 or the light-receiving unit 40, a driving mechanism for each of the rollers and the like.

The light-emitting unit 30 and the light-receiving unit 40 are mounted on their driving mechanisms 50 so that they can be moved parallel with a center axis of the column-like optical waveguide structure 21A. The light-emitting unit 30 and the light-receiving unit 40 are separately lifted up and down so that they can be positioned at a desired position opposing the optical waveguide 2A.

The image input board 11 has a function of capturing an image from the outside and transmitting it to other board(s). The image output board 12 has a function of receiving an image-processing signal and transmitting it to the outside.

The remote-control-signal-receiving board 13 has a function of transmitting to other board(s) a broadband signal including identification (ID) number for identifying each board, zoom ratio, DRC parameter and the like. The zoom-board 14 has a function of zooming the image. The DRC volume board 15 has a function of performing the high-definition of the image.

In the signal-processing apparatus 10A, in order to transmit an instruction to each board, it may be necessary to provide a signal path through which the remote-control-signal-receiving board 13 can transmit the signal to the image input board 11, the image output board 12, the zoom board 14 and the DRC volume board 15.

In order to process the image captured from the outside, it may be necessary to provide a signal path through which the image input board 11 can transmit the signal to the zoom board 14 and the DRC volume board 15. In order to transmit the image processed in the zoom board 14 or process it in the DRC volume board 15, it may be necessary to provide a signal path through which the zoom board 14 can transmit the signal to the DRC volume board 15 and the image output board 12. In order to transmit the image processed in the DRC volume board 15, it may be necessary to provide a signal path through which the DRC volume board 15 can transmit the signal to the image output board 12.

In this embodiment, four layered optical waveguides 2A are stacked so that these signal paths can be dynamically changed.

FIGS. 32 through 35 show the signal paths of respective layered optical waveguides. In a first layered optical waveguide 2A1, as shown in FIG. 32, the signal path through which the remote-control-signal-receiving board 13 can transmit the signal to the image input board 11, the image output board 12, the zoom board 14 and the DRC volume board 15 is realized.

In a second layered optical waveguide 2A2, as shown in FIG. 33, the signal path through which the image input board 11 can transmit the signal to the zoom board 14 and the DRC volume board 15 is realized.

Figure 34:
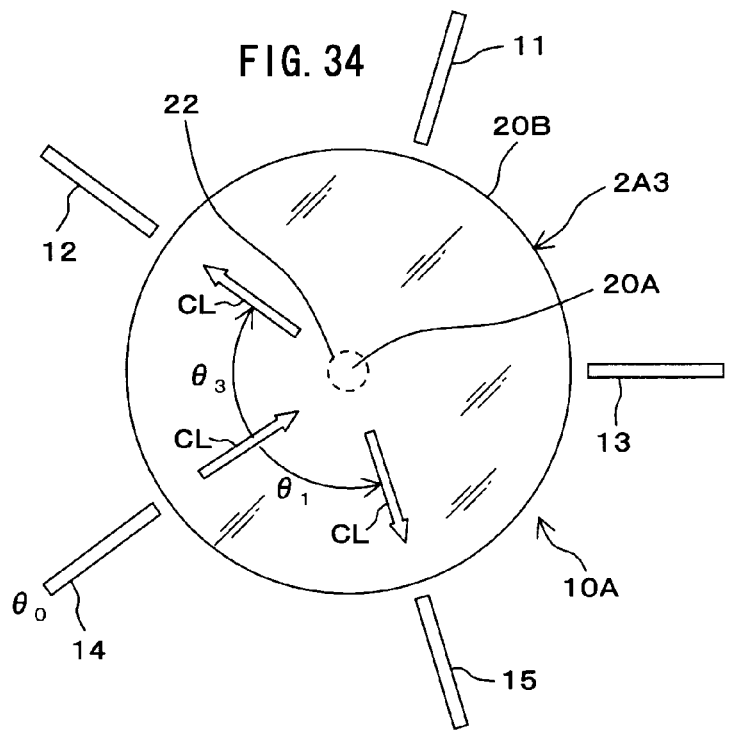
FIG. 34 is a schematic diagram showing an example of signal paths in a third optical waveguide.

In a third layered optical waveguide 2A3, as shown in FIG. 34, the signal path through which the zoom board 14 can transmit the signal to the DRC volume board 15 and the image output board 12 is realized.

Figure 35:
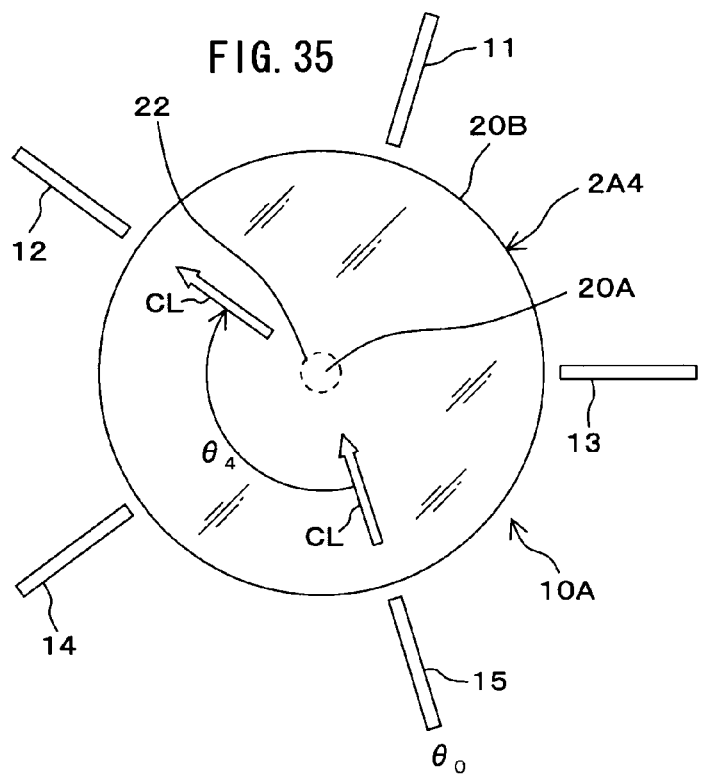
FIG. 35 is a schematic diagram showing an example of signal paths in a fourth optical waveguide.

In a fourth layered optical waveguide 2A4, as shown in FIG. 35, the signal path through which the DRC volume board 15 can transmit the signal to the image output board 12 is realized.

The five functional boards are positioned around the circumference of each optical waveguide 2A. The five functional boards are positioned with them having the same distance therebetween so as to allow desired directivities to be realized in the above-mentioned respective signal paths. If a light is incident from a functional board that is positioned at an angle, the optical waveguides 2A having desired directivities of at least four directions in which the other functional boards are positioned may be used. Here, the directivity is referred to as a case where the direction in which the level of the light is higher than that of other positions around of each optical waveguides 2A or the levels of the light that are emitted from plural positions become the same.

Thus, four layered optical waveguides 2A having the different directivities thus stacked allows respective function boards to be positioned at angles of the desired directivities in all the signal paths shown in FIGS. 32 through 35 between the functional board of the output side of the signal and the functional board of the input side of the signal.

[Operation Example of the Embodiment of Signal-Processing Apparatus]

Figure 36:
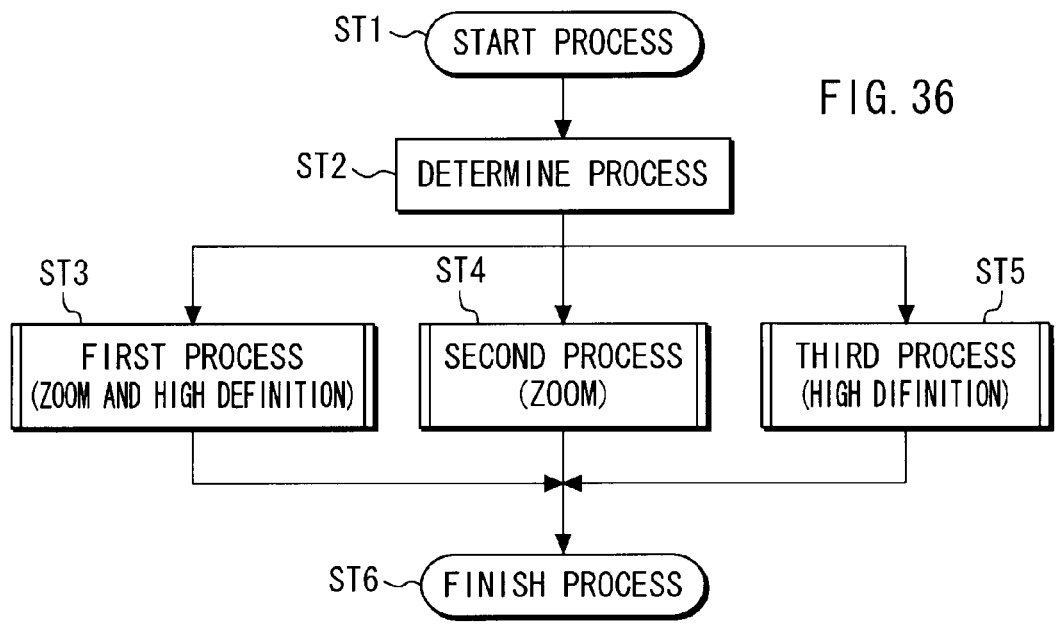
FIG. 36 is a flowchart showing an example of an operation of the whole signal-processing apparatus.

FIG. 36 shows an example of an operation of the whole signal-processing apparatus. FIGS. 37 through 40 show examples of the change-over of the signal paths in the signal-processing apparatus. The following will describe the operation of the signal-processing apparatus 10A.

At step ST1 shown in FIG. 36, the process starts and at step ST2, process is determined. This determination of the process is carried out due to the operation of the function selection by the user. When the user selects the function of the first process and determines the first process at the step ST2, the first process (the zoom process and the high definition process) is carried out at step ST3 and at step ST6, the process ends corresponding to the user's end operation.

When the user selects the function of the second process and determines the second process at the step ST2, the second process (the zoom process) is carried out at step ST4 and at step ST6, the process ends corresponding to the user's end operation.

When the user selects the function of the third process and determines the third process at the step ST2, the third process (the high definition process) is carried out at step ST5 and at step ST6, the process ends corresponding to the user's end operation.

At the first process, the image captured from the outside at the image input board 11 is sent to the zoom board 14; the image zoomed at the zoom board 14 is sent to the DRC volume board 15; and the image on which the DRC volume board 15 performs the high definition is sent to the image output board 12 which outputs it to the outside.

Figure 37:
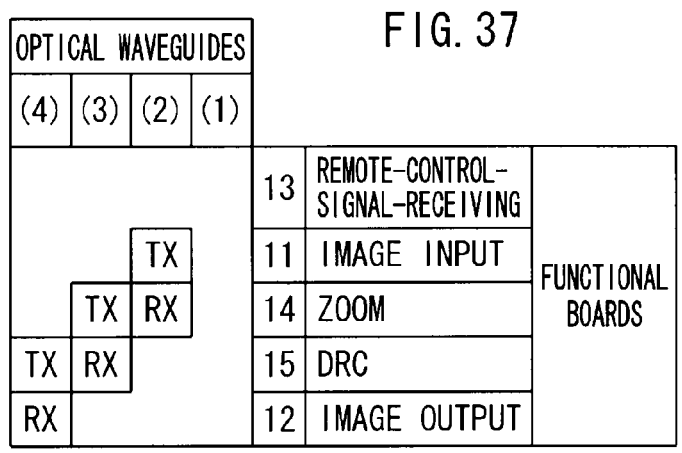
FIG. 37 is a diagram showing an example of a change-over of the signal paths.

In order to realize the signal path at the first process, the second layered optical waveguide 2A2 has a desired directivity on a relation where the image input board 11 is an outside and the zoom board 14 is an input side. This causes the light-emitting portion 30 (TX) of the image input board 11 to be opposed to the second layered optical waveguide 2A2, as shown in FIG. 37. This also causes the light-receiving portion 40 (RX) of the zoom board 14 to be opposed to the second layered optical waveguide 2A2.

The third layered optical waveguide 2A3 has a desired directivity on a relation where the zoom board 14 is an outside and the DRC volume board 15 is an input side. This causes the light-emitting portion 30 (TX) of the zoom board 14 to be opposed to the third layered optical waveguide 2A3. This also causes the light-receiving portion 40 (RX) of the DRC volume board 15 to be opposed to the third layered optical waveguide 2A3.

The fourth layered optical waveguide 2A4 has a desired directivity on a relation where the DRC volume board 15 is an outside and the image output board 12 is an input side. This causes the light-emitting portion 30 (TX) of the DRC volume board 15 to be opposed to the fourth layered optical waveguide 2A4. This also causes the light-receiving portion 40 (RX) of the image output board 12 to be opposed to the fourth layered optical waveguide 2A4.

Changing over the signal paths allows the image signal Vin received at the image input board 11 to be propagated into the second layered optical waveguide 2A2 and to be received as the image signal which should be processed in the zoom board 14 when selecting the function of the first process.

The zoom board 14 performs the zoom processing on the image signal Vin. The image signal obtained at the zoom board 14 is propagated into the third layered optical waveguide 2A3 and is received as the image signal to be processed at the DRC volume board 15.

The DRC volume board 15 performs the high-definition process on the received image signal. The image signal obtained at the DRC volume board 15 is propagated into the fourth layered optical waveguide 2A4 and is received at the image output board 12 which outputs it as the output image signal Vout.

At the first process, the signal paths are respectively changed to the one in which the light has the desired directivity between the image input board 11 and the zoom board 14, between the zoom board 14 and the DRC volume board 15 or between the DRC volume board 15 and the image output board 12. This enables a communication between the functional boards by the light to be performed without any loss.

At the second process, the image captured from the outside at the image input board 11 is sent to the zoom board 14 and the image zoomed at the zoom board 14 is sent to the image output board 12 which outputs it to the outside.

Figure 38:
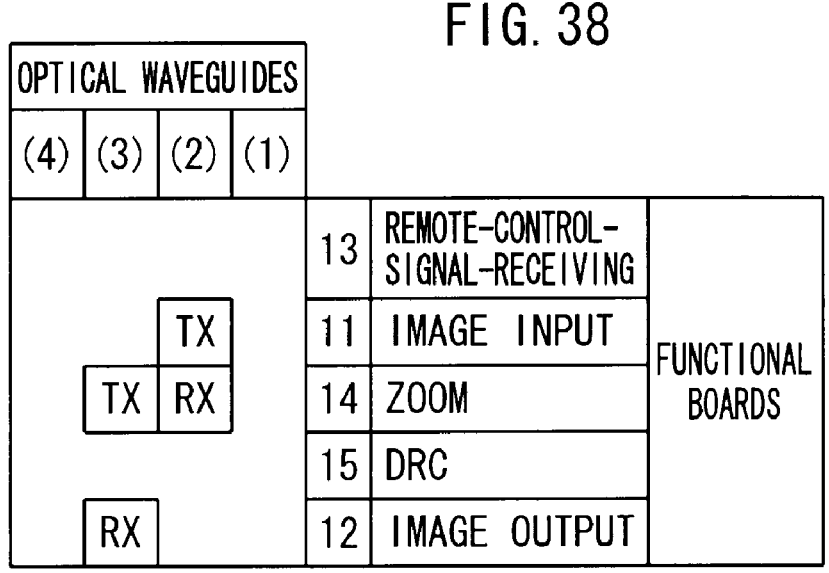
FIG. 38 is a diagram showing an example of a change-over of the signal paths.

In order to realize the signal path at the second process, the second layered optical waveguide 2A2 has a desired directivity on a relation where the image input board 11 is an outside and the zoom board 14 is an input side. This causes the light-emitting portion 30 (TX) of the image input board 11 to be opposed to the second layered optical waveguide 2A2, as shown in FIG. 38. This also causes the light-receiving portion 40 (RX) of the zoom board 14 to be opposed to the second layered optical waveguide 2A2.

The third layered optical waveguide 2A3 has a desired directivity on a relation where the zoom board 14 is an outside and the image output board 12 is an input side. This causes the light-emitting portion 30 (TX) of the zoom board 14 to be opposed to the third layered optical waveguide 2A3. This also causes the light-receiving portion 40 (RX) of the image output board 12 to be opposed to the third layered optical waveguide 2A3.

Changing over the signal paths allows the image signal Vin received at the image input board 11 to be propagated into the second layered optical waveguide 2A2 and to be received as the image signal which should be processed in the zoom board 14 when selecting the function of the second process.

The zoom board 14 performs the zoom processing on the image signal Vin. The image signal obtained at the zoom board 14 is propagated into the third layered optical waveguide 2A3 and is received at the image output board 12 which outputs it as the output image signal Vout.

At the second process, the signal paths are respectively changed to the one in which the light has the desired directivity between the image input board 11 and the zoom board 14 or between the zoom board 14 and the image output board 12. This enables a communication between the functional boards by the light to be performed without any loss.

At the third process, the image captured from the outside at the image input board 11 is sent to the DRC volume board 15 and the image on which the DRC volume board 15 performs the high-definition is sent to the image output board 12 which outputs it to the outside.

Figure 39:
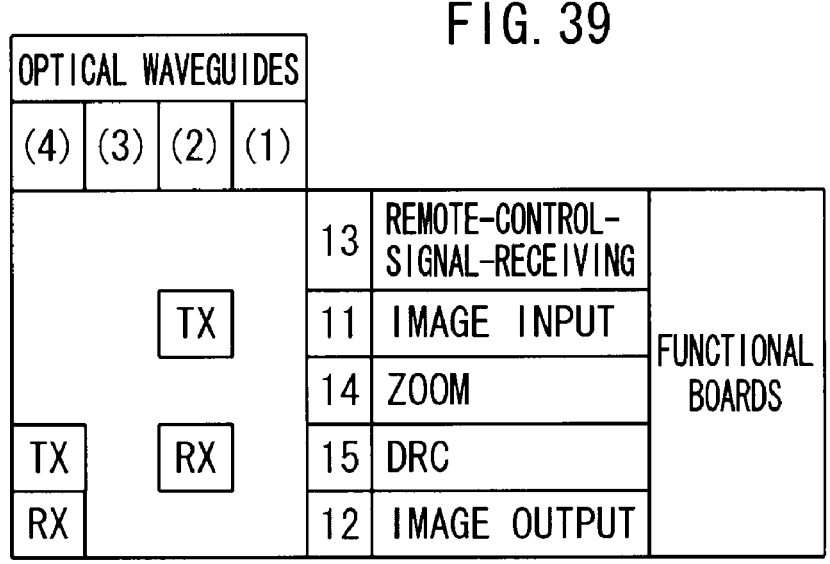
FIG. 39 is a diagram showing an example of a change-over of the signal paths.

In order to realize the signal path at the third process, the second layered optical waveguide 2A2 has a desired directivity on a relation where the image input board 11 is an outside and the DRC volume board 15 is an input side. This causes the light-emitting portion 30 (TX) of the image input board 11 to be opposed to the second layered optical waveguide 2A2, as shown in FIG. 39. This also causes the light-receiving portion 40 (RX) of the DRC volume board 15 to be opposed to the second layered optical waveguide 2A2.

The fourth layered optical waveguide 2A4 has a desired directivity on a relation where the DRC volume board 15 is an outside and the image output board 12 is an input side. This causes the light-emitting portion 30 (TX) of the DRC volume board 15 to be opposed to the fourth layered optical waveguide 2A4. This also causes the light-receiving portion 40 (RX) of the image output board 12 to be opposed to the fourth layered optical waveguide 2A4.

Changing over the signal paths allows the image signal Vin received at the image input board 11 to be propagated into the second layered optical waveguide 2A2 and to be received as the image signal which should be processed in the DRC volume board 15 when selecting the function of the third process.

The DRC volume board 15 performs the high-definition processing on the image signal Vin. The image signal obtained at the DRC volume board 15 is propagated into the fourth layered optical waveguide 2A4 and is received at the image output board 12 which outputs it as the output image signal Vout.

At the third process, the signal paths are respectively changed to the one in which the light has the desired directivity between the image input board 11 and the DRC volume board 15 or between the DRC volume board 15 and the image output board 12. This enables a communication between the functional boards by the light to be performed without any loss.

The remote-control-signal-receiving board 13 sends the signal to each functional board when the remote-control-signal-receiving board 13 allocates the ID to each functional board, the zoom board 14 sets the zoom ratio or the DRC volume board 15 sets the DRC parameters.

In order to realize the signal paths, the first layered optical waveguide 2A1 has a desired directivity on a relation where the remote-control-signal-receiving board 13 is an outside and other boards are an input side. This causes the light-emitting portion 30 (TX) of the remote-control-signal-receiving board 13 to be opposed to the first layered optical waveguide 2A1, as shown in FIG. 40. This also causes each of the light-receiving portions 40 (RX) of the image input board 11, the image output board 12, the zoom board 14 and the DRC volume board 15 to be opposed to the first layered optical waveguide 2A1.

Changing over the signal paths allows, for example, the ID output from the remote-control-signal-receiving board 13 to be propagated into the first layered optical waveguide 2A1 and to be received at the image input board 11, the image output board 12, the zoom board 14 and the DRC volume board 15.

Changing over the signal paths also allows the signal for setting the zoom ratio, which is output from the remote-control-signal-receiving board 13, to be propagated into the first layered optical waveguide 2A1 and to be received at the zoom board 14. Changing over the signal paths allows the signal for setting the DRC parameters, which is output from the remote-control-signal-receiving board 13, to be propagated into the first layered optical waveguide 2A1 and to be received at the DRC volume board 15.

In various kinds of the above-mentioned setting processes, the signal path is respectively changed to the one in which the light has the desired directivity between the remote-control-signal-receiving board 13 and each of the image input board 11, the image output board 12, the zoom board 14 and the DRC volume board 15. This enables a communication between the functional boards by the light to be performed without any loss.

It is to be noted that although four functional boards have been used in the above-mentioned embodiment of the signal-processing apparatus, this invention is not limited thereto. Further, the number of the layers of the optical waveguides alters according to the number of the signal paths to be realized. Although the optical waveguides having the identical directivity in each layer have stacked, the optical waveguides having the different directivities may be stacked according to the signal path to be realized in each layer.

For example, when the first optical waveguide portion 20A of the optical waveguide 2A is formed as the regular column and a direction of the regular column in the stacked optical waveguide 2A of each layer alters, it is possible to change the directivity thereof.

This invention is applicable to the optical selector switch which is capable of performing a signal transmission between a transmitting side and a receiving side according to a point-to-multipoint system, a multipoint-to-point system or a multipoint-to multipoint system by changing the signal transmission paths.

It should be understood by those skilled in the art that various modifications, combinations, sub-combinations and alterations may occur depending on design requirements and other factors insofar as they are within the scope of the appended claims or the equivalents thereof.

What is claimed is:

1. An optical selector switch comprising:
    an optical waveguide that includes a first optical waveguide portion having a first light-transmissivity, a second optical waveguide portion having a second light-transmissivity and being provided over a whole side surface of the first optical waveguide portion, reflecting members that reflect light and are positioned on both upper and lower surfaces of the first optical waveguide portion and the second optical waveguide portion so as to be opposed to each other with the reflecting members exposing an outer circumference of the second optical waveguide portion, and a light-dividing device that reflects a predetermined ratio of the light and transmits the remains thereof, the light-dividing device being positioned at a boundary of the first and second optical waveguide portions;
    at least one light-emitting unit that emits the light toward the first optical waveguide portion of the optical waveguide, the light-emitting unit being positioned with a predetermined angle along the outer circumference of the second optical waveguide portion of the optical waveguide; and
    at least one light-receiving unit that receives the light which is incident to the first optical waveguide portion of the optical waveguide from the light-emitting unit, the light-receiving unit being positioned with a predetermined angle along the outer circumference of the second optical waveguide portion of the optical waveguide, based on a directivity due to an angle of the incident light to the first optical waveguide portion of the optical waveguide,
    wherein the incident light to the first optical waveguide portion of the optical waveguide from a single angle or separate angles is emitted radially toward the circumference of the second optical waveguide portion of the optical waveguide with the incident light having at least one of directivity.

2. The optical selector switch according to claim 1 wherein the first optical waveguide portion has a shape like a pillar and the light-dividing device is positioned at an outer circumference of the first optical waveguide portion.

3. The optical selector switch according to claim 2 wherein the second optical waveguide portion is an air layer.

4. The optical selector switch according to claim 2 wherein the first optical waveguide portion has a shape like a column.

5. The optical selector switch according to claim 2 wherein the first optical waveguide portion has a shape like a polygon column.

6. The optical selector switch according to claim 2 wherein the first optical waveguide portion has a shape like a regular polygon column.

7. The optical selector switch according to claim 1 wherein the incident light that is incident to the first optical waveguide portion of the optical waveguide from the light-emitting unit has a spot diameter which is equal to a diameter of the first optical waveguide portion.

8. The optical selector switch according to claim 1 wherein the incident light that is incident to the first optical waveguide portion of the optical waveguide from the light-emitting unit has a spot diameter which is smaller than a diameter of the first optical waveguide portion and the incident light is incident to a position of the first optical waveguide portion, the position being deviated from a center of the first optical waveguide portion.

9. The optical selector switch according to claim 6 wherein the incident light that is incident to the first optical waveguide portion of the optical waveguide from the light-emitting unit is incident to a center of the first optical waveguide portion from a vertex of the regular polygon column of the first optical waveguide portion.

10. The optical selector switch according to claim 6 wherein the incident light that is incident to the first optical waveguide portion of the optical waveguide from the light-emitting unit is incident to a center of the first optical waveguide portion from a surface of the regular polygon column of the first optical waveguide portion.

11. The optical selector switch according to claim 6 wherein the incident light that is incident to the first optical waveguide portion of the optical waveguide from the light-emitting unit is incident parallel to a surface of the regular polygon column of the first optical waveguide portion having odd-numbered vertexes.

12. The optical selector switch according to claim 1 wherein the second optical waveguide portion has a hollow space and the light-dividing device is positioned at an inner surface of the second optical waveguide portion.

13. The optical selector switch according to claim 12 wherein the second optical waveguide portion has the hollow space like a column.

14. The optical selector switch according to claim 12 wherein the second optical waveguide portion has the hollow space like a polygon column.

15. The optical selector switch according to claim 14 wherein the second optical waveguide portion has the hollow space like a regular polygon column.

16. The optical selector switch according to claim 12 wherein the incident light that is incident to the first optical waveguide portion of the optical waveguide from the light-emitting unit is incident from a vertex of the regular-polygon-column-shaped hollow space in the second optical waveguide portion.

17. The optical selector switch according to claim 12 wherein the incident light that is incident to the first optical waveguide portion of the optical waveguide from the light-emitting unit is incident from a surface of the regular-polygon-column-shaped hollow space in the second optical waveguide portion.

18. The optical selector switch according to claim 12 wherein the incident light that is incident to the first optical waveguide portion of the optical waveguide from the light-emitting unit is incident parallel to a surface of the regular-polygon-column-shaped hollow space in the second optical waveguide portion having odd-numbered vertexes.

19. The optical selector switch according to claim 1 wherein the plural light-receiving units are positioned so as to be away from a center of the first optical waveguide portion of the optical waveguide by the same distance.

20. The optical selector switch according to claim 1 wherein said at least one light-receiving unit is positioned based on the directivity of the light directed radially toward the circumference of the optical waveguide, the directivity being obtained by calculating an optical path of the light that is incident to the first optical waveguide portion of the optical waveguide from the light-emitting unit and is reflected by the light-dividing device, and an optical path of the light that is transmitted through the light-dividing device and is refracted based on a difference in the first light-transmissivity of the first optical waveguide and the second light-transmissivity of the second optical waveguide.

21. A signal-processing apparatus comprising:
at least one optical waveguide that includes a first optical waveguide portion having a first light-transmissivity, a second optical waveguide portion having a second light-transmissivity and being provided over a whole side surface of the first optical waveguide portion, reflecting members that reflect light and are positioned on both upper and lower surfaces of the first optical waveguide portion and the second optical waveguide portion so as to be opposed to each other with the reflecting members exposing an outer circumference of the second optical waveguide portion, and a light-dividing device that reflects a predetermined ratio of the light and transmits the remains thereof, the light-dividing device being positioned at a boundary of the first and second optical waveguide portions, wherein the incident light to the first optical waveguide portion of the optical waveguide from a single angle or separate angles is emitted radially toward the circumference of the second optical waveguide portion of the optical waveguide with the incident light having at least one of directivity; and
plural functional boards each having a light-emitting unit that emits the light toward the first optical waveguide portion of the optical waveguide and a light-receiving unit that receives the light which is incident to the first optical waveguide portion of the optical waveguide from the light-emitting unit, the plural functional boards being positioned with a predetermined angle along the outer circumference of the second optical waveguide portion of the optical waveguide, based on a directivity due to an angle of the incident light to the first optical waveguide portion of the optical waveguide.

22. The signal-processing apparatus according to claim 21 wherein a plurality of the optical waveguides are stacked with a light-shielding member being interleaved therebetween;
wherein each of the functional boards includes at least one of driving mechanisms that drives the light-emitting unit to move along a stacked direction of the optical waveguides and meets the light-emitting unit to a desired optical waveguide of the stacked optical waveguides and that drives the light-receiving unit to move along a stacked direction of the optical waveguides and meets the light-receiving unit to the desired optical waveguide of the stacked optical waveguides; and
wherein the plural functional boards are positioned with a signal path in each of the optical waveguides between the desired functional boards being met to the directivity of the incident light in each of the optical waveguides.

* * * * *